US012111669B2

(12) United States Patent
Graham et al.

(10) Patent No.: US 12,111,669 B2
(45) Date of Patent: *Oct. 8, 2024

(54) SYSTEMS AND METHODS FOR PROVIDING AN AUGMENTED REALITY INTERFACE FOR THE MANAGEMENT AND MAINTENANCE OF BUILDING SYSTEMS

(71) Applicant: CrowdComfort, Inc., Boston, MA (US)

(72) Inventors: B. Eric Graham, Wenham, MA (US); Abdullah Daoud, Lynnfield, MA (US); Galen C. Nelson, Boston, MA (US); Chris Fuentes, Plaistow, NH (US); Kevin Loos, Cambridge, MA (US); Jeff Mcaulay, Cambridge, MA (US)

(73) Assignee: CrowdComfort, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/386,780

(22) Filed: Nov. 3, 2023

(65) Prior Publication Data
US 2024/0143002 A1     May 2, 2024

Related U.S. Application Data

(63) Continuation of application No. 18/088,462, filed on Dec. 23, 2022, now Pat. No. 11,841,719, which is a
(Continued)

(51) Int. Cl.
*G05D 23/19* (2006.01)
*F24F 11/30* (2018.01)
(Continued)

(52) U.S. Cl.
CPC .......... *G05D 23/1927* (2013.01); *F24F 11/30* (2018.01); *F24F 11/58* (2018.01);
(Continued)

(58) Field of Classification Search
CPC . G05D 23/1927; G05D 23/1917; F24F 11/30; F24F 11/52; G05B 15/02; G05B 19/048; G05B 2219/2614; G06F 3/002; G06F 3/011; G06F 3/0481; G06F 3/0482; G06F 3/04886; G06Q 10/06
See application file for complete search history.

(56) References Cited

U.S. PATENT DOCUMENTS

2010/0286937 A1* 11/2010 Hedley ................. G06Q 50/06
                                                                            702/60
2011/0115816 A1*  5/2011 Brackney ............. G06T 19/006
                                                                            700/295
(Continued)

*Primary Examiner* — Zhipeng Wang
(74) *Attorney, Agent, or Firm* — Nutter McClennen & Fish LLP

(57) ABSTRACT

The present invention relates to systems and methods for improved building systems management and maintenance. The present invention provides a system for providing an augmented reality-like interface for the management and maintenance of building systems, specifically the mechanical, electrical, and plumbing (MEP) systems within a building, including the heating, ventilation, and air-conditioning (HVAC) systems.

20 Claims, 30 Drawing Sheets

Related U.S. Application Data continuation of application No. 17/530,147, filed on Nov. 18, 2021, now Pat. No. 11,579,639, which is a continuation of application No. 16/538,075, filed on Aug. 12, 2019, now Pat. No. 11,181,936, which is a continuation of application No. 15/615,249, filed on Jun. 6, 2017, now Pat. No. 10,379,551, which is a continuation-in-part of application No. 15/472,913, filed on Mar. 29, 2017, now Pat. No. 10,215,435, which is a continuation of application No. 14/328,492, filed on Jul. 10, 2014, now Pat. No. 9,625,922.

(60) Provisional application No. 62/346,532, filed on Jun. 6, 2016, provisional application No. 61/903,123, filed on Nov. 12, 2013, provisional application No. 61/844,494, filed on Jul. 10, 2013.

(51) Int. Cl.
| | | |
|---|---|---|
| *F24F 11/58* | (2018.01) | |
| *G05B 15/02* | (2006.01) | |
| *G05B 19/048* | (2006.01) | |
| *G06F 3/00* | (2006.01) | |
| *G06F 3/01* | (2006.01) | |
| *G06F 3/0481* | (2022.01) | |
| *G06F 3/0482* | (2013.01) | |
| *G06F 3/04886* | (2022.01) | |
| *G06Q 10/06* | (2023.01) | |
| *F24F 11/52* | (2018.01) | |

(52) U.S. Cl.
CPC ........... *G05B 15/02* (2013.01); *G05B 19/048* (2013.01); *G05D 23/1917* (2013.01); *G06F 3/002* (2013.01); *G06F 3/011* (2013.01); *G06F 3/0481* (2013.01); *G06F 3/0482* (2013.01); *G06F 3/04886* (2013.01); *G06Q 10/06* (2013.01); *F24F 11/52* (2018.01); *G05B 2219/2614* (2013.01)

(56) References Cited

U.S. PATENT DOCUMENTS

| | | | | |
|---|---|---|---|---|
| 2013/0059598 | A1* | 3/2013 | Miyagi | ................. H04W 4/023 455/456.1 |
| 2013/0169681 | A1* | 7/2013 | Rasane | ................. G06T 19/003 345/633 |

\* cited by examiner

|  | Totals | Pole results | | |
| --- | --- | --- | --- | --- |
|  |  | Increase | Decrease | No Change |
| people who work in the zone | 38 |  |  |  |
| people responding to the temperature adjustment initiation | 30 | 20 | 5 | 5 |
| Weighting |  | 0.67 | 0.17 | 0.17 |
| Increase/-decrease weighting | 0.50 | 0.58 | 0.08 |  |
| Max Change in degrees F | 5.00 |  |  |  |
| Recommended Change | 2.50 |  |  |  |
| Recommended Change (Rounded) | 2.50 | Recommended increase in temperature | | |

Fig. 4D

- View your reports here
- Select '+' to add report

- Scan QR code or manually look up

- Scan QR code or manually look up
- Geo-location identifies what building you are in

- Choose thermal or maintenance report
- Geo-located maintenance reporting was added to increase the value of the reporting functionality for facilities management staff and increase occupancy usage rates of the application.

- Rate your comfort
- We built a 5 point slide bar including freezing, cold, just right, hot, and very hot on the far right.

- Option to include text and/or take an image to add to the report.

- See report activity around you
- Option to 'agree' or comment on reports

- See reports that received the most 'agrees' in your area

Once a deficiency or maintenance issue is reported, managers can address these issues on the fly.

*Add a comment*    *Change report status*    *Assign report*

- In notification center, select 'assigned to me'
- View and manage reports that have been assigned to you

- Identify what asset you are inspecting
- App populates appropriate checklist
- Once complete, data is aggregated, analyzed, and stored on the cloud

SYSTEMS AND METHODS FOR PROVIDING AN AUGMENTED REALITY INTERFACE FOR THE MANAGEMENT AND MAINTENANCE OF BUILDING SYSTEMS

CROSS REFERENCE TO RELATED APPLICATIONS

This application is a continuation of U.S. patent application Ser. No. 18/088,462, filed Dec. 23, 2022, which is a continuation of U.S. patent application Ser. No. 17/530,147, filed Nov. 18, 2021 (U.S. Pat. No. 11,579,639), which is a continuation of U.S. patent application Ser. No. 16/538,075, filed Aug. 12, 2019 (U.S. Pat. No. 11,181,936), which is a continuation of U.S. patent application Ser. No. 15/615,249, filed Jun. 6, 2017 (U.S. Pat. No. 10,379,551), which claims the benefit of, and priority to, U.S. Provisional Application No. 62/346,532, filed Jun. 6, 2016, and which is a continuation-in-part of U.S. patent application Ser. No. 15/472,913, filed Mar. 29, 2017 (U.S. Pat. No. 10,215,435), which is a continuation of U.S. patent application Ser. No. 14/328,492, filed Jul. 10, 2014, which issued as U.S. Pat. No. 9,625,922, which claims the benefit of, and priority to, U.S. Provisional Application No. 61/844,494, filed Jul. 10, 2013, and U.S. Provisional Application No. 61/903,123, filed Nov. 12, 2013, the contents of each of which are hereby incorporated by reference herein in their entireties.

FIELD OF THE INVENTION

The present disclosure relates generally to management systems and methods, and, more particularly, to a system for providing an augmented reality-like interface for the management and maintenance of building systems, specifically the mechanical, electrical, and plumbing (MEP) systems within a building, including the heating, ventilation, and air-conditioning (HVAC) systems.

BACKGROUND

A building automation system, sometimes referred to as a building control system, is a computerized network of electronic devices that can be configured to control one or more systems such as, but not limited to, mechanical, electrical, lighting, and security systems of a building. For example, a building automation system can be configured to control a heating, ventilation, and air conditioning (HVAC) system and its components for a building. A building automation system may be used to further control various components of the previously noted systems, including, but not limited to, chillers, boilers, Air Handling Units (AHUs), Roof-top Units (RTUs), Fan Coil Units (FCUs), Heat Pump Units (HPUs), Variable Air Volume boxes (VAVs).

Although current building automation systems allow for some degree of control and management over a variety of different systems within a building, such systems suffer drawbacks. For example, while known building automation systems are configured for scalability and a certain amount of flexibility, there is a continuing need to optimally and efficiently manage, organize, and provide the large amounts and types of data available within a building, particularly to those users who rely on such data and need to take action, such as a facility manager, a building maintenance engineer, or the like.

SUMMARY

The present invention includes a system for providing an augmented reality-like interface for the management and maintenance of building systems, specifically mechanical, electrical, and plumbing (MEP) systems within a building, which may include heating, ventilation, and air-conditioning (HVAC) systems. In particular, the system includes a central management information system is configured to correlate crowd-sourced data with building automation system data and output an augmented reality-like interface to one or more users responsible for, or otherwise associated with, control or maintenance over the building systems, such as a facilities manager or a building maintenance engineer. The augmented reality-like interface generally provides a visual rendering of a component of a building system and further includes information associated with at least one of the operating parameters, visual diagnostics, and maintenance status of the component. The interface allows for a user to interact with the visual rendering to control different parameters of the component and/or address any maintenance issues, as based on the crowdsourced data.

For example, the crowd-sourced data may generally be collected from patrons or employees within a space and may be related to comfort issues such as HVAC (e.g., temperature of a particular room within a building), building maintenance issues (e.g., lighting issues, cleanliness of facilities, etc.), as well as other aspects of a building or space that may be useful in management of such space. The building automation system data may generally include information related to individual pieces of equipment or components for any given environmental system within a space (i.e., within the building). The equipment information may include, but is not limited to, equipment specifications, operating parameters of the equipment, equipment diagnostics, as well as maintenance status of the equipment. The building automation system data may further include one or more files including one or more visual renderings of the equipment, including still images and moving images (two-dimensional and three-dimensional) for providing visual illustration of the equipment and the internal components of the equipment, as well as illustrations depicting real-time diagnostics of the component while in operation.

The central management information system is configured to receive both crowdsourced data (data related to patron comfort levels or maintenance issues, as well as QR codes associated with such data) and building automation system data (e.g., data related to the environmental control systems (e.g., HVAC system and individual equipment)) to provide a facility manager/operator with an augmented reality-like graphical interface with which they may interact to address any required maintenance or equipment issues. For example, in some embodiments, the system is configured to recognize when a user cans a QR code at a given location. The QR codes, or similar tags, may be placed at specific locations within a building, and, upon scanning the QR code, the system is configured to receive crowdsourced data associated with the particular QR code and further receive building automation system data based on the scanning event. In particular, the QR code may act as an identifier, signaling the system to receive data associated with a given piece of equipment or system at the particular location in which the QR code is location. For example, a user (e.g., building maintenance worker) may scan a QR code within a given office within a building, wherein the system is then configured to receive the scanning event, receive crowdsourced data associated with the scanning event, and further pull up schematics and/or a list of equipment within the walls of the office. The system provides such equipment information to the user on the user's mobile device via an augmented reality-like graphical interface. The equipment information may further provide a user with potential problems if connected to a central facility management system. The equipment information may further provide the user with any maintenance and inspections that need to performed.

As such, a user, such as a facility manager, a building maintenance engineer, or the like, may directly interact with the building automation system and the equipment in a direct manner via their mobile device, while utilizing the crowdsourcing platform in which patrons or employees within the building can provide their comfort levels and/or maintenance issues. Accordingly, the system of the present invention provides a robust and optimal communication systems for improving building maintenance.

BRIEF DESCRIPTION OF THE DRAWINGS

Features and advantages of the claimed subject matter will be apparent from the following detailed description of embodiments consistent therewith, which description should be considered with reference to the accompanying drawings:

FIG. 4D is a table populated with data and rules in accordance with embodiments of the present invention;

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

By way of overview, the present invention provides an augmented reality-like interface for the management and maintenance of building systems, specifically mechanical, electrical, and plumbing (MEP) systems within a building, which may include heating, ventilation, and air-conditioning (HVAC) systems. In particular, the system includes a central management information system is configured to correlate crowd-sourced data with building automation system data and output an augmented reality-like interface to one or more users responsible for, or otherwise associated with, control or maintenance over the building systems, such as a facilities manager or a building maintenance engineer. The augmented reality-like interface generally provides a visual rendering of a component of a building system and further includes information associated with at least one of the operating parameters, visual diagnostics, and maintenance status of the component. The interface allows for a user to interact with the visual rendering to control different parameters of the component and/or address any maintenance issues, as based on the crowdsourced data.

The following description describes an overall method and system for providing automated report generation, aggregation, and response, in a network-based transaction facility are described. In the following description, for purposes of explanation, numerous specific details are set forth in order to provide a thorough understanding of the present invention. It will be evident, however, to one skilled in the art that the present invention may be practiced without these specific details. It should be noted that the central management information system of the present disclosure utilizes data acquired and stored via methods and systems described in FIGS. 1A-19.

Figure 1A:
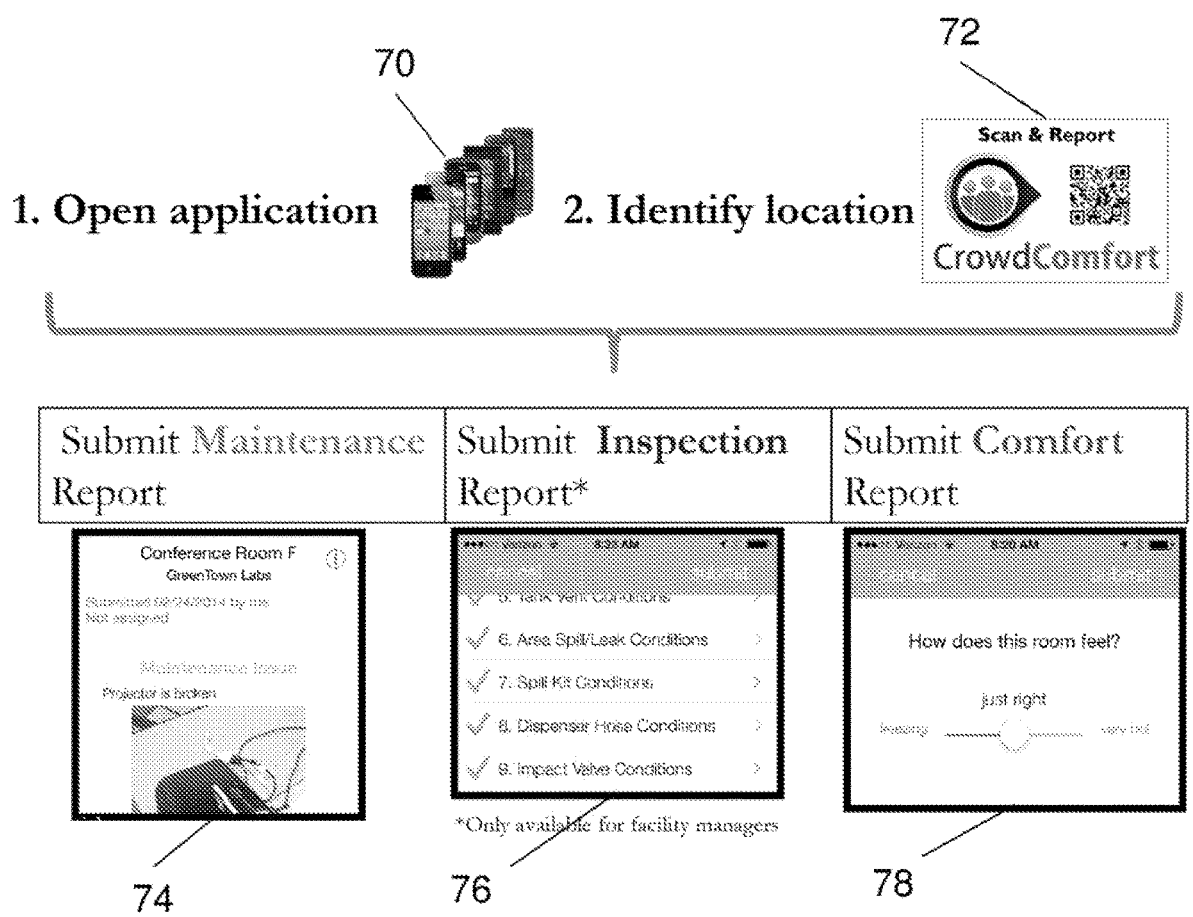
FIG. 1A is a schematic representation of aspects of an embodiment of the present invention.
Figure 1B:
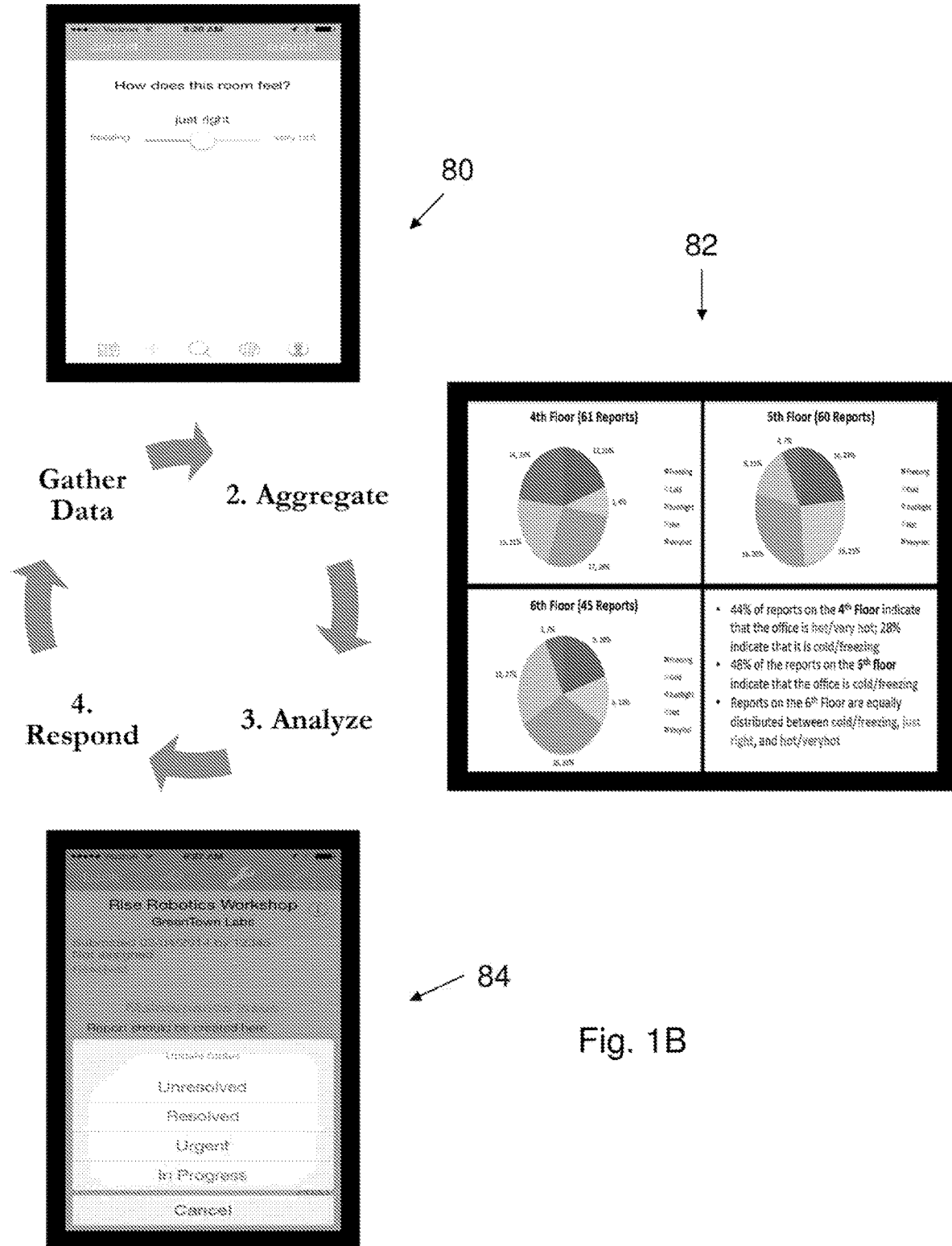
FIG. 1B is a schematic representation of aspects of an embodiment of the present invention.

Referring to FIG. 1A, embodiments of the present invention offer building owners, operators, and occupants a new and powerful way to share information about comfort, maintenance, and safety issues with an easy to use smart device application. These embodiments convert this crowd sourced feedback into time stamped, geo-located aggregated reports/maps, which are actionable through a custom portal allowing building owners or facility managers to respond more rapidly and cost effectively to occupant concerns. These embodiments democratize and amplify the voices of building occupants, while helping building owners to pinpoint energy and operational saving opportunities. Referring to FIG. 1A, users may open application 70, identify a location 72, e.g., by scanning a QR Code, and generate a maintenance report 74, an inspection report 76 and/or a comfort report 78. Referring now to FIG. 1B, once these reports are collected at 80, they are aggregated and analyzed (e.g., mapped) based on location at 82, and then automatically communicated to an appropriate recipient for response 84. In these embodiments, thermal comfort is facilitated by leveraging the power of employees to identify energy savings opportunities, improve comfort and worker productivity. Facilities management is facilitated by collecting, aggregating, and delivering real-time, geo-located reports on comfort and maintenance issues. Environmental compliance and inspection is facilitated by replacing the clipboard with real-time, site-specific environmental compliance reporting.

Various embodiments operate by initially having facility managers identify locations for data collection in and/or around particular properties. Markers are printed, delivered, and placed at the identified locations. Employees/Inspectors are notified, asked to download the application, and begin reporting. Facilities managers gain instant access to the secure portal where the data is aggregated and displayed. From the inventive platform, maintenance reports are converted into work orders that can be efficiently organized, addressed, and stored. As these reports are processed the employees who filed them are notified of progress through their phones. In particular embodiments, building systems are adjusted automatically in response to the aggregated, geo-located reports.

Potential benefits include: engaging employees and making them part of the solution; improving health, safety and security within an organization; collection of meaningful data that can be leveraged to support high-impact recommendations; use of predictive analytics to identify maintenance needs before they become problems; and/or optimization of workflow efficiency for building maintenance.

Reporting comfort and/or maintenance issues is simply the first step. By capturing and highlighting occupant discomfort, occupants can provide a compelling feedback loop to building owners—and the cloud—to address these problems and reduce energy consumption, while improving building occupants' comfort. Initial embodiments may simply provide crowd sourced feedback to building facility managers/owners informing them the extent to which building HVAC system design, set points, and overall operation is meeting occupant comfort expectations. Ultimately, crowd sourced reactions would directly influence or directly control HVAC operation (temperature and humidity levels) alongside required ventilation/air exchange rates (e.g. ASHRAE standards 62.1 and 90.1) to better match the comfort needs of a preponderance of building occupants by tying feedback directly to the building's energy management system. For example, if 90% of the occupants in a convention center feel too chilly, air conditioning set points may be raised slightly and energy consumption reduced.

Particular embodiments capture crowd sourced comfort level information periodically via a simple icon based interface. Occupants may receive a simple periodic query—perhaps via text message, via Twitter, or other platforms—asking them to characterize their comfort level (e.g. very cold, somewhat cold, comfortable, warm, very warm). Users may then respond using the system interface shown and described herein. Taken together, this data would inform building facility managers, and directly influence building HVAC set points. Looking beyond the building boundary, in various embodiments, this aggregated data may be shared on-line in a Google maps-type interface where users could mouse over buildings and see reports in the aggregate (e.g. how many, and when, users reported being uncomfortable). These reports would be updated over time based on user feedback. Such user feedback would motivate building owners to react, due to the potential positive or negative occupant ratings that could have a real effect on the property's value. At the same time, building owners could voluntarily report improvement they had made to their buildings at the same web based platform. These embodiments would thus actively support building owners who take proactive steps to provide the most comfortable and energy efficient buildings.

Application deployment/partnership options may include: Event registration sites; Employer databases/corporate sustainability leadership; Hotels; Public Transit/trains, etc. Additional applications may include power supply impacts—facility owners, utilities, and grid operators could use this platform to communicate important grid and air quality data to building occupants. For example, a preponderance of building occupants might be willing to tolerate a slightly higher indoor temperature during a hot summer day if they knew that by shedding that load, grid operators could avoid starting coal fired peaking power plants. In other words, these embodiments may complement and augment existing demand response programs.

Also, by use of relatively high resolution location data, e.g., by use of QR Codes, microGPS, etc., facility operators may begin to better understand HVAC design and operation problems at the distribution level, targeting solutions such as more localized controls, VAV (Variable Air Volume) box operation, or other conditions (e.g. excessive passive solar) addressing tenant comfort concerns and related energy use.

Building owners and users could capture more value from the app over time by pushing more and more sophisticated questions to app users, particularly repeat users, including questions like: "how would you rate the air quality in your building?" Occupants who participate in using these embodiments will be providing valuable data on the building systems, but will also be educating building managers about their preferences. This understanding will allow building owners and employers to place workers in environments with similar temperature preferences to potentially improve work satisfaction and productivity. Repeat users may build a profile and climate preference.

For the purposes of the present specification, the term "transaction" shall be taken to include any communications between two or more entities and shall be construed to include, but not be limited to, transferring data including reports and responses between computers, downloading software applications or "apps" including graphical user interface components, and commercial transactions including sale and purchase transactions, and the like.

As used herein, the terms "computer" and "end-user device" are meant to encompass a workstation, personal computer, personal digital assistant (PDA) or smart phone, wireless telephone, tablet, or any other suitable computing device including a processor, a computer readable medium upon which computer readable program code (including instructions and/or data) may be disposed, and a user interface. Terms such as "server", "application", "engine" and the like are intended to refer to a computer-related component, including hardware, software, and/or software in execution. For example, an engine may be, but is not limited to being, a process running on a processor, a processor including an object, an executable, a thread of execution, a program, and a computer. Moreover, the various components may be localized on one computer and/or distributed between two or more computers. The terms "real-time" and "on-demand" refer to sensing and responding to external events nearly simultaneously (e.g., within milliseconds or microseconds) with their occurrence, or without intentional delay, given the processing limitations of the system and the time required to accurately respond to the inputs.

Terms such as "component," "module", "control components/devices," "messenger component or service," and the like are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server (or control related devices) can be components. One or more components may reside within a process and/or thread of execution and a component may be localized on one computer and/or distributed between two or more computers or control devices.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

The system and method embodying the present invention can be programmed in any suitable language and technology, such as, but not limited to: C++; Visual Basic; Java; VBScript; Jscript; BCMAscript; DHTM1; XML and CGI. Alternative versions may be developed using other programming languages including, Hypertext Markup Language (HTML), Active ServerPages (ASP) and Javascript. Any suitable database technology can be employed, such as, but not limited to, Microsoft SQL Server or IBM AS 400.

Referring now to the figures, embodiments of the present invention will be more thoroughly described.

FIG. 1 is a block diagram illustrating an exemplary network-based transaction facility in the form of an Internet-based report generation and aggregation facility 10. The report facility includes one or more of a number of types of front-end servers, namely page servers 12 that deliver web pages (e.g., markup language reports), picture servers 14 that dynamically deliver images to be displayed within Web pages, CGI (Common Gateway Interface) servers 18 that provide an intelligent interface to the back-end of facility 10, and search servers 20 that handle search requests to the facility 10. E-mail/communication servers 21 provide, inter alia, automated e-mail (and optionally, text and/or social media) communications to users of the facility 10. The back-end servers may include a database engine server 22, a search index server 24 and a payment (e.g., credit card and/or subscription) database server 26, each of which may maintain and facilitate access to a respective database. Facility 10 may also include an administrative application server 28 configured to provide various administrative functions.

The network-based report generation and aggregation facility 10 may be accessed by a client program 30, such as a browser (e.g., the Internet Explorer distributed by Microsoft) that executes on a client machine 32 such as a smart phone, and accesses the facility 10 via a network such as, for example, the Internet 34. Other examples of networks that a client may utilize to access the facility 10 include a wide area network (WAN), a local area network (LAN), a wireless network (e.g., a cellular network), or the Plain Old Telephone Service (POTS) network.

Figure 2:
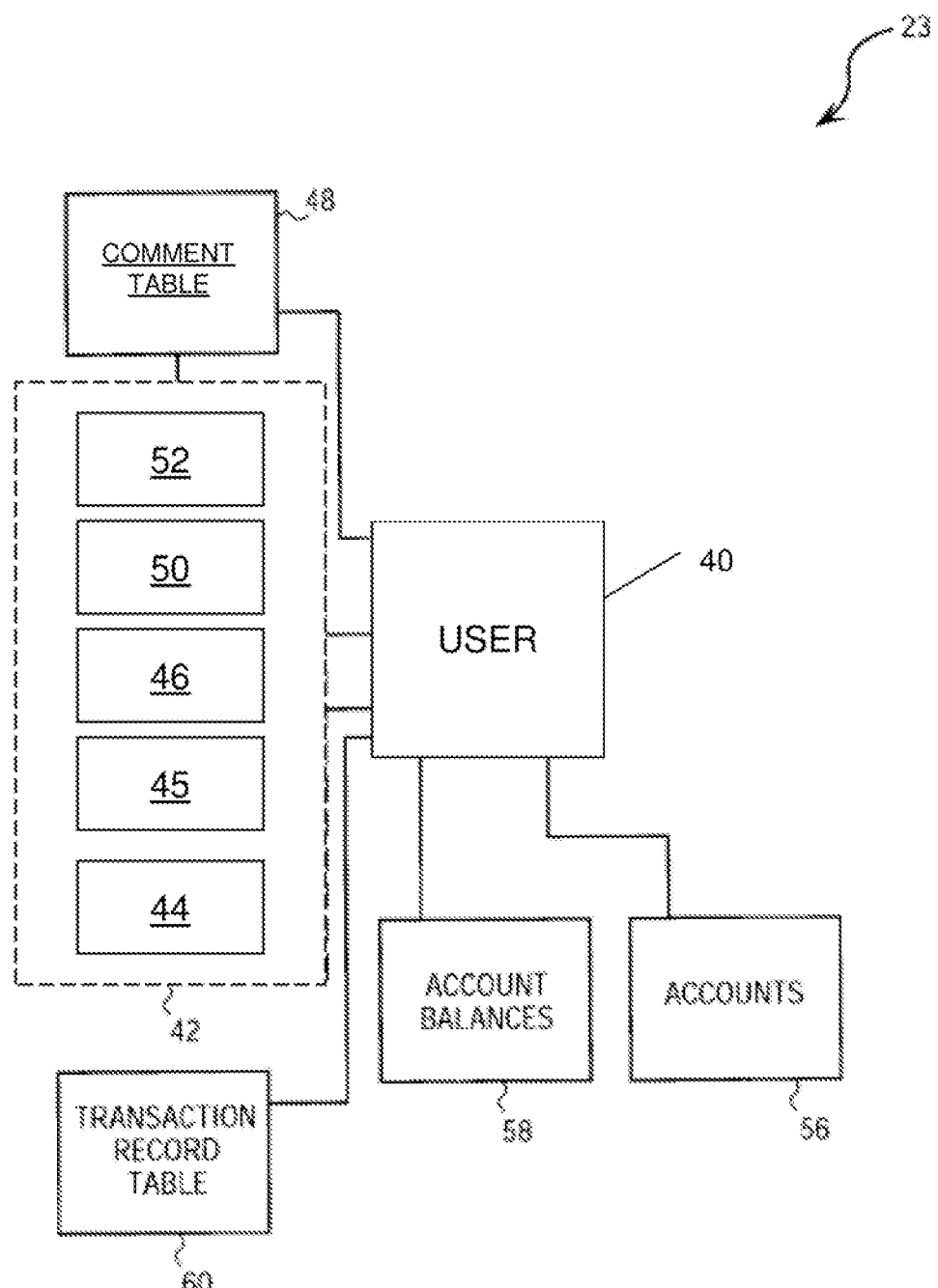
FIG. 2 is a block diagram of one embodiment of a database maintained by a database engine server.

FIG. 2 is a database diagram illustrating an exemplary database 23, maintained by and accessed via the database engine server 22, which at least partially implements and supports the report generation and aggregation facility 10. The database 23 may, in one embodiment, be implemented as a relational database, and includes a number of tables having entries, or records, that are linked by indices and keys. In an alternative embodiment, the database 23 may be implemented as collection of objects in an object-oriented database.

As shown, central to the database 23 is a user table 40, which contains a record for each user of the facility 10. The database 23 also includes tables 42 that may be linked to the user table 40. Specifically, the tables 42 may include property report (e.g., geo-located building report) table 44, and various property specific tables, such as a building locations table 45, inspection list table 46, comfort rules table 50, and a user-customizable table 52. A user record in the user table 40 may be linked to multiple reports that are being, or have been, generated via the facility 10 and for which records exist within the report tables 42. The database 23 may also include a comment table 48 populatable with comment records that may be linked to one or more report records within the report tables 42. A number of other tables may also be linked to the user table 40, such as an accounts table 56, an account balances table 58 and a transaction record table 60.

Figure 3:
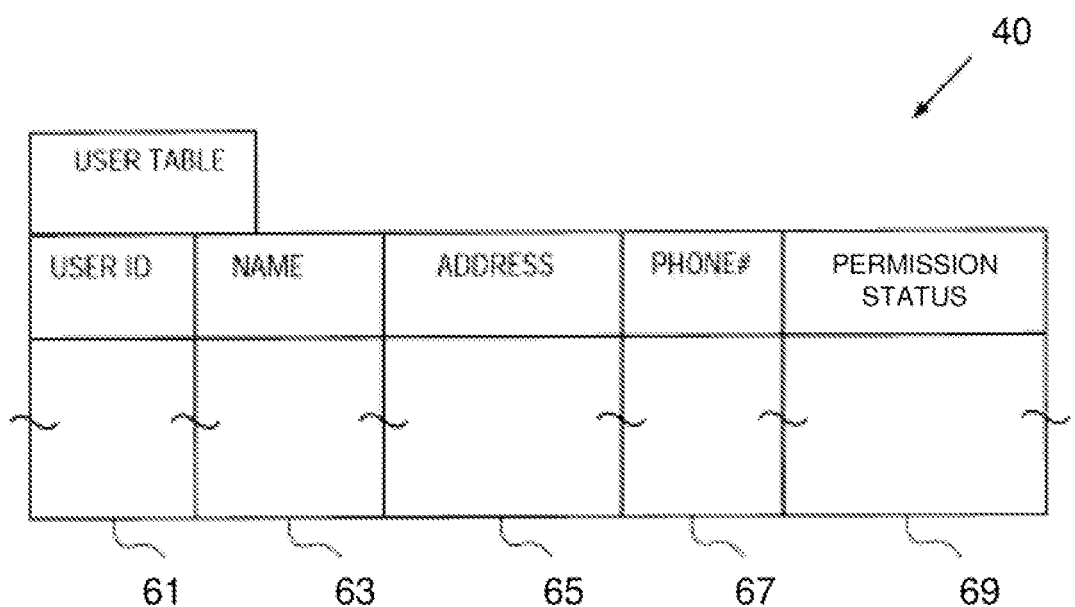
FIG. 3 is a diagrammatic representation of one embodiment of a user table within the database.

FIG. 3 is a diagrammatic representation of an exemplary embodiment of the user table 40 that is populated with records, or entries, for each user of the facility 10. As shown, table 40 includes a user identifier column 61 that stores a unique identifier for each user. A name column 63 may store a first name, a middle initial and a last name for each user. An address column 65 may store address information and/or other contact information for each user, e.g. an employer name, and/or street name and number, city, zip code, state, email address, etc. A phone number column 67 stores a phone (e.g., mobile) number for each user. A permission status column 69 may store, for each user, a value identifying the user's permission status, i.e., the user's ability to access particular features of the system, such as those typically provided to a manager or other user tasked with responding to particular reports, etc. It should be recognized that the amount of information stored may vary depending on the permission level assigned to the particular user. Table 40 may also store any additional information that may be desired for particular applications. For example, subscription information may be recorded (not shown), in which different values may be assigned to indicate whether a user has a currently valid subscription, has an expired subscription (which may provide only limited access to facility 10). It will be appreciated that any information other than that described above may populate the user table 40 without loss of generality.

Figure 4A:
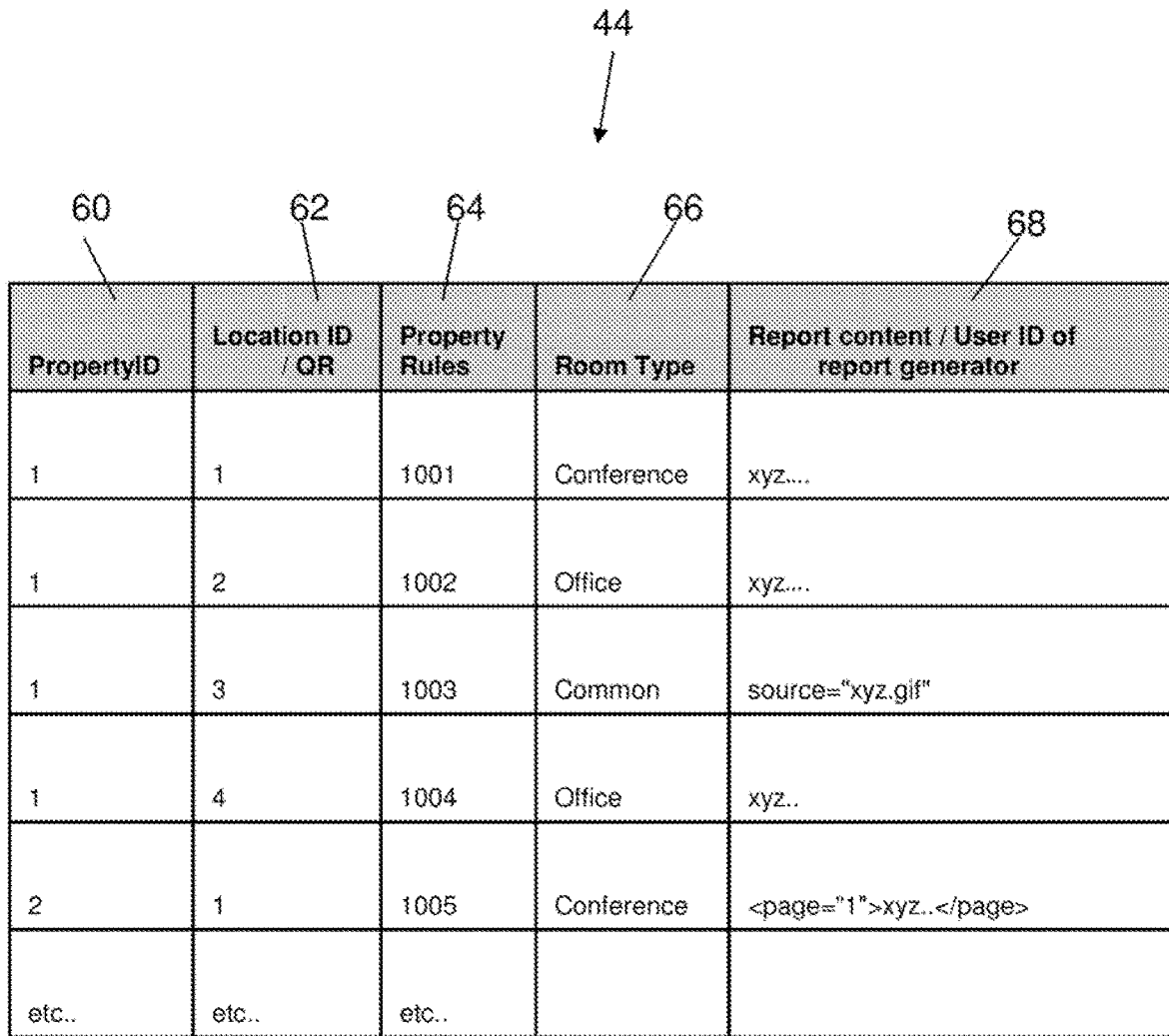
FIG. 4A is a diagrammatic representation of one embodiment of a property information table within the database.

FIG. 4A is a diagrammatic representation of an exemplary embodiment of a table 44 populated with property report records generated during use of the report generation facility 10. As shown, table 44 includes a property ID column 60 to identify particular properties, a location ID/QR column 62 to track particular locations, e.g., as designated with a QR Code or similar tag placed at the location, a property rules column 64 to provide a pointer or other reference to maintenance lists 45, inspection lists 46, comfort rules tables 50, and/or user-customizable table 52, associated with the particular property. A room type column 66 provides the type of space tagged by the QR Code, e.g., conference room, private office, etc. Report content column 68 is populated with the actual content of a report generated by the system, along with the User ID of the individual responsible for generating the report.

It will be appreciated that in particular embodiments, other descriptive information may also populate table 44, without departing from the scope of the present invention. For example, additional columns may be provided to capture information regarding the number of employees typically occupying a particular room type, and/or the number of rooms of a particular room type in the property or HVAC zone. Yet another column, for example, may identify the HVAC zone within which a particular location ID/QR Code is located.

Figure 4B:
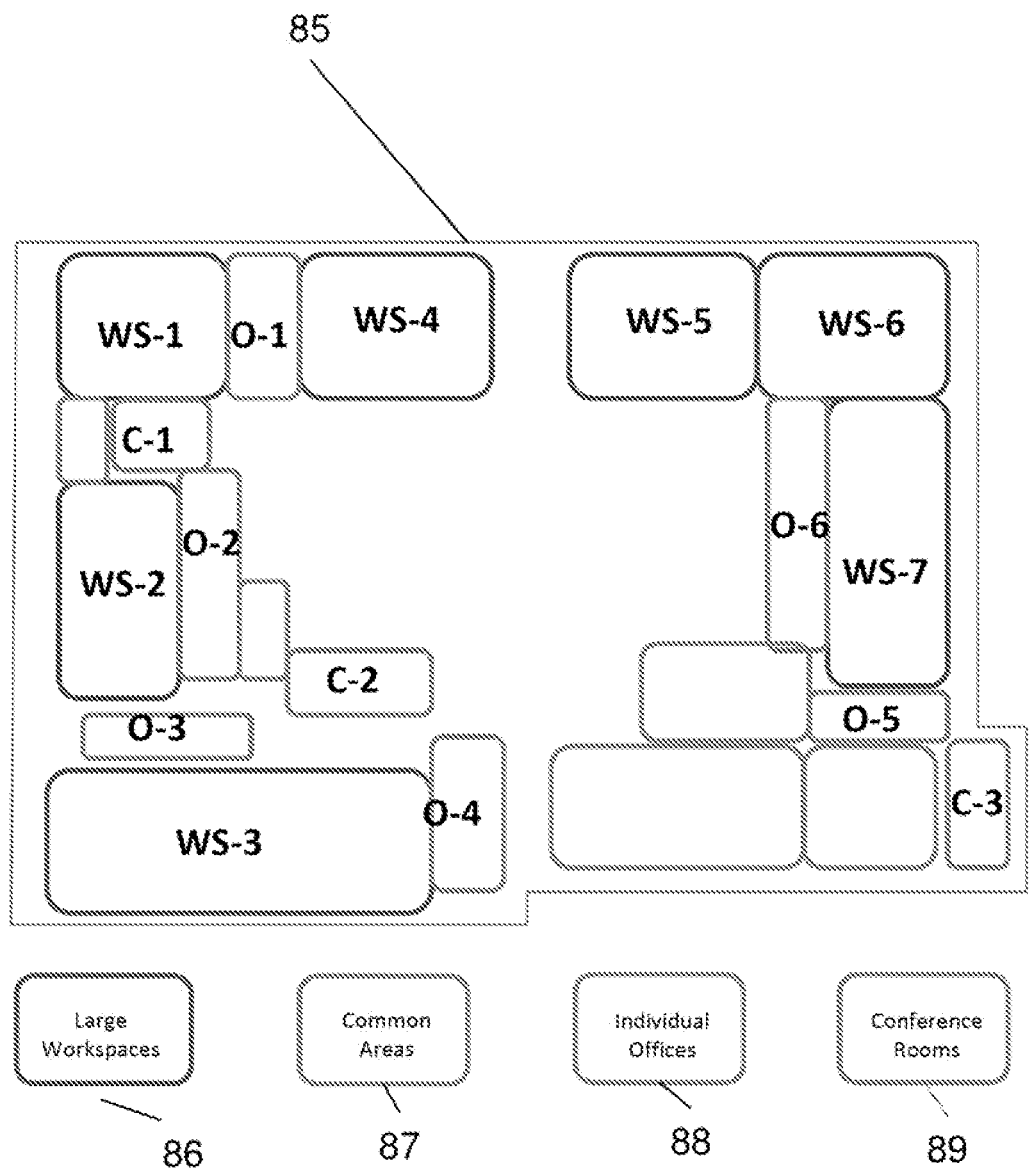
FIG. 4B is a schematic representation of a floor plan usable with embodiments of the present invention.
Figure 4C:
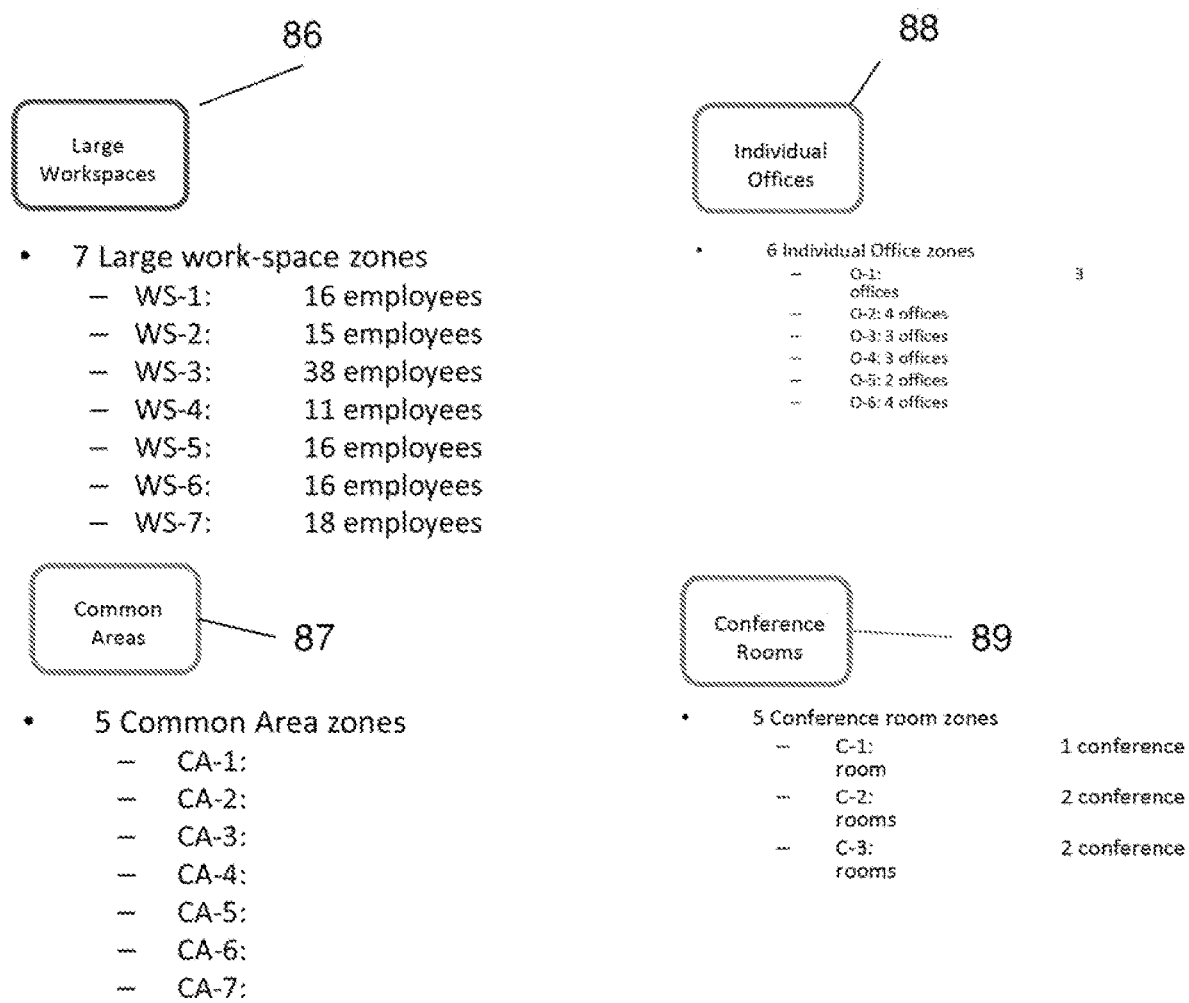
FIG. 4C is a table with summaries of information shown in the floor plan of FIG. 4B.

Turning now to FIGS. 4B and 4C, information used to populate table 44 may be obtained from a floor plan 85 (FIG. 4B) of a particular property, which as shown, has been segregated into various room types, such as large workspaces 86, common areas 87, individual offices 88, and conference rooms 89. In FIG. 4C, some of the room types have optionally been associated with additional information, such as typical occupancy levels (for Large Workspaces), and the number of rooms of a particular type, e.g., Individual Offices and Conference Rooms.

As mentioned hereinabove, embodiments of the present invention provide geo-located mobile application that allows employees and managers to report comfort levels and maintenance issues from anywhere, easily and instantaneously. This information is processed through a cloud-based report aggregation server(s) and shared with managers in real-time through a secure portal that provides comfort and maintenance information, optionally including preventive maintenance such as inspection lists, in aggregated reports. This data can be used to engage employees, improve workflow, drive operational savings, and optimize organizational performance.

These embodiments enable such report generation and aggregation in a real-time, web-based, client-server environment. While the present invention is discussed within the environment of the exemplary report aggregation facility 10, it will readily be appreciated that the present invention may be used in any number of environments including network and on-line based transaction facilities in business-to-business, business-to-consumer and consumer-to-consumer applications.

Figure 5:
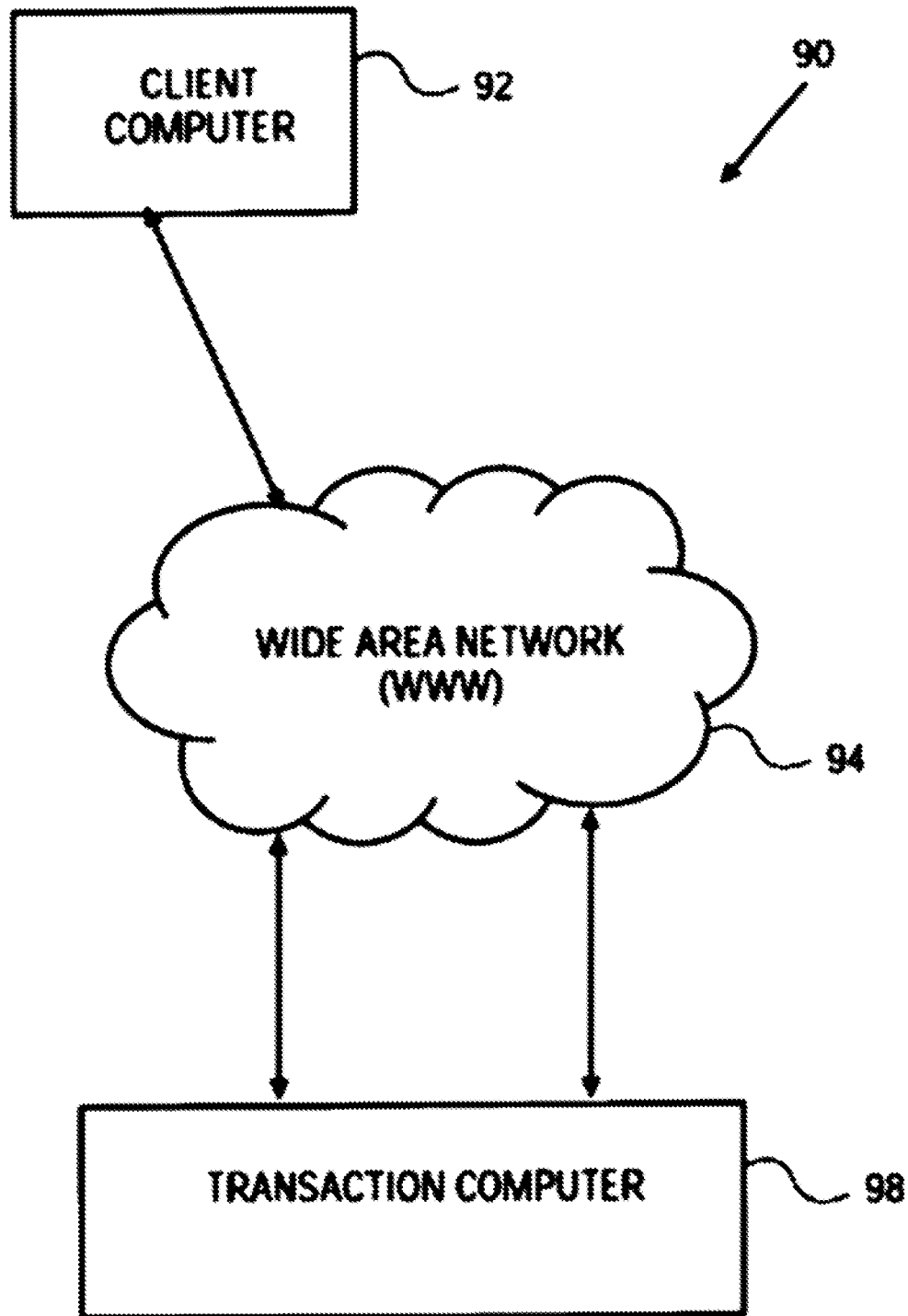
FIG. 5 is a simplified schematic diagram of one embodiment of a system within which aspects of the present invention may be embodied.

FIG. 5 is a simplified block diagram of a system 90 for generating reports in accordance with an exemplary embodiment of the present invention. In this embodiment, a client computer 92 is coupled to a transaction computer 98 via a communications network (e.g. a wide area network) 94. The client computer 92 represents a device that allows a user to interact with the report generation and aggregation facility 10 or any other transaction facility 98. In one embodiment, the client computer 92 presents to the user a report generation interface for generating reports and viewing content aggregated be the transaction computer 98.

Figure 1C:
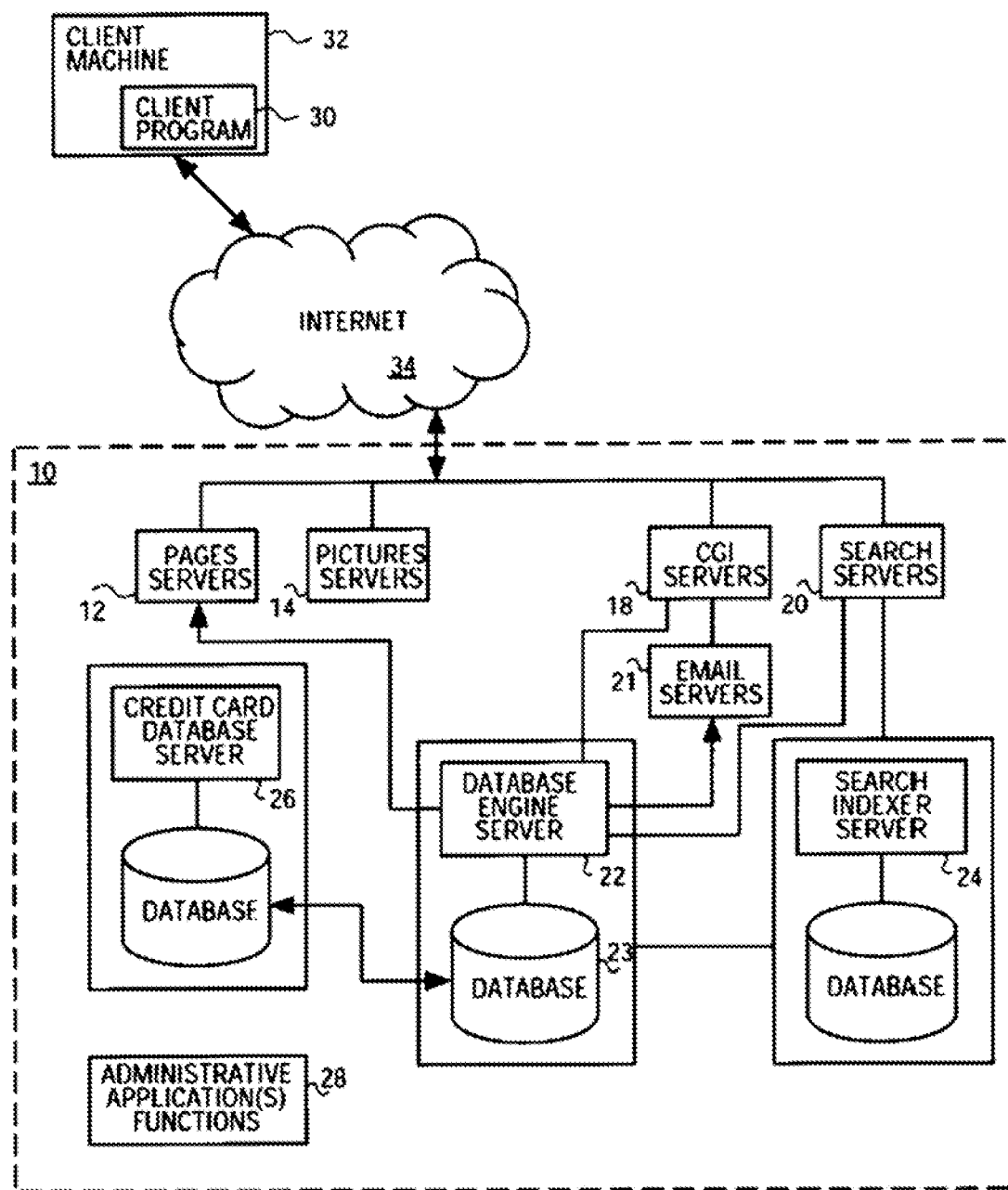
FIG. 1C is a block diagram of one embodiment of a network-based transaction facility according to an embodiment of the present invention.

The transaction computer 98, which supports a facility such as shown at 10 of FIG. 1C, handles transactions between various participants of the facility 10 including the user of the client computer 92. In one embodiment, the transaction computer 98 may initially receive the personal information of the participant from the client computer 92, and generate a subscription result which determines whether, and to what extent, the user is granted access to the facility 10. The transaction computer then facilitates the aggregation of reports in accordance with various user interfaces presented by the computer 98, via the client computer 92, to the user.

Figure 6:
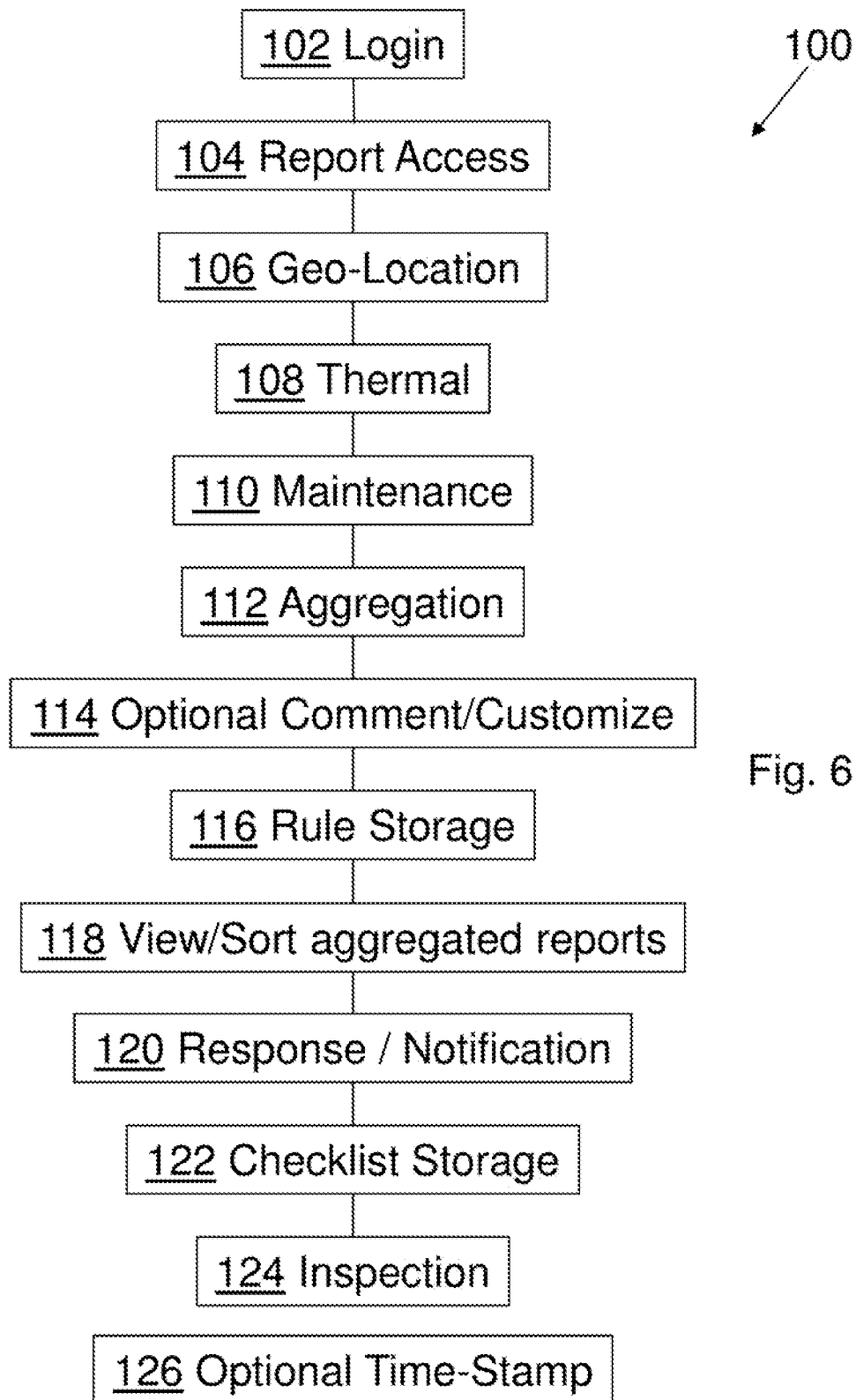
FIG. 6 is a block diagram of one embodiment of an interface sequence in accordance with embodiments of the present invention.

FIG. 6 shows a series 100 of interfaces/modules, such as may take the form of a series of objects (or methods), that may be implemented by the report aggregation facility 10, e.g., in combination with the various tables of database 23, for the purposes of generating and aggregating reports. The series 100 of interface modules shown in FIG. 6 will be described with reference to exemplary representations of the various interfaces as shown in FIGS. 8-18. It should be noted that the various modules may reside and operate on the facility 10 or alternatively, one or more of the modules, or components thereof, may be initially downloaded from the facility 10, e.g., as an application or "app", for installation on a user's smart phone, tablet or other user device 32. The skilled artisan will recognize that distribution of some components onto user devices may provide benefits such as reducing the amount of communication traffic between the user devices and the facility 10.

As shown, series 100 includes a login module 102, configured to generate a login interface through which a user of the facility 10 provides at least a user identifier and associated password. The login module may include a permissions module configured to provide selective access to the server by one or more users in accordance with permissions assigned to each user, e.g., based on whether the user is an employee of a building tenant or other building occupant, or whether the user is a manager or other responsible party having authority to address reports aggregated by the facility 10. Optionally, some users, such as the aforementioned manager, may also be requested to pay a subscription fee for access to the system.

Figure 8:
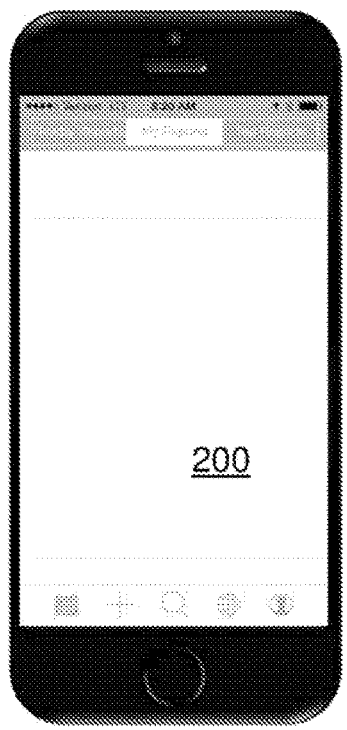
FIG. 8 is an exemplary representation of an interface included in the sequence of interfaces shown in FIG. 6.
Figure 9:
FIG. 9 is an exemplary representation of an interface included in the sequence of interfaces shown in FIG. 6.
Figure 10:
FIG. 10 is an exemplary representation of an interface included in the sequence of interfaces shown in FIG. 6.
Figure 11:
FIG. 11 is an exemplary representation of an interface included in the sequence of interfaces shown in FIG. 6.
Figure 12:
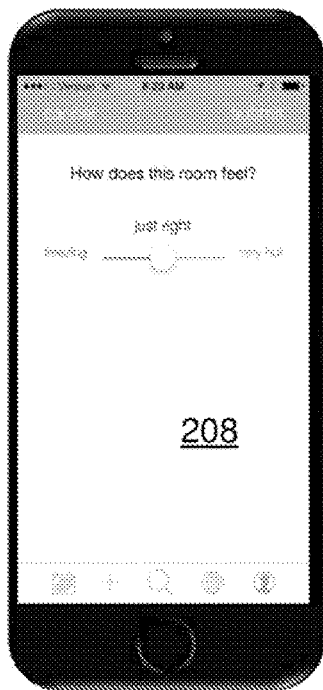
FIG. 12 is an exemplary representation of an interface included in the sequence of interfaces shown in FIG. 6.
Figure 13:
FIG. 13 is an exemplary representation of an interface included in the sequence of interfaces shown in FIG. 6.
Figure 14:
FIG. 14 is an exemplary representation of an interface included in the sequence of interfaces shown in FIG. 6.
Figure 15:
FIG. 15 is an exemplary representation of an interface included in the sequence of interfaces shown in FIG. 6.
Figure 16A:
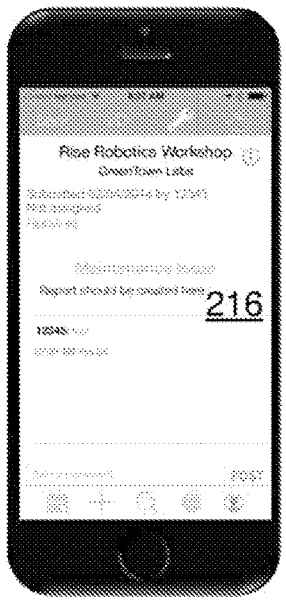
FIG. 16A is an exemplary representation of an interface included in the sequence of interfaces shown in FIG. 6.
Figure 16B:
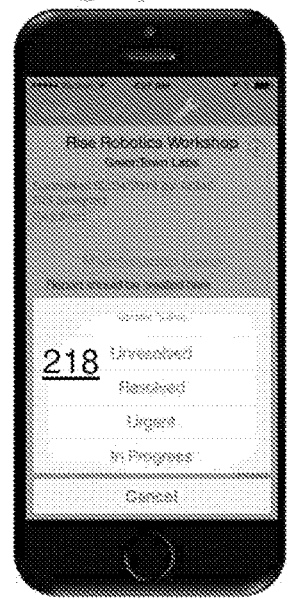
FIG. 16B is an exemplary representation of an interface included in the sequence of interfaces shown in FIG. 6.
Figure 16C:
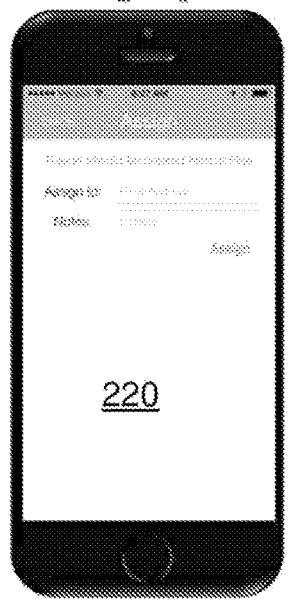
FIG. 16C is an exemplary representation of an interface included in the sequence of interfaces shown in FIG. 6.

A report access module 104 is configured to generate a report interface, such as shown at 200 in FIG. 8. Module 104 interacts with the various tables of database 23 (FIG. 1C) to enable a user to generate a new report by scanning a QR code at 202 (FIG. 9), using geo-location module 106, or by looking up a particular location, e.g., within a particular building at 204 (FIG. 10), which then permits the user to select the type of report at 206 (FIG. 11). Selecting "Rate Thermal Comfort" actuates thermal module 108, while selecting "Report a Maintenance Issue" actuates maintenance module 110, both of which permit the user to supply data, such as a thermal rating at 208 of FIG. 12 and/or a maintenance request at 210 of FIG. 13. An optional time-stamp module 126 is configured to store a time stamp denoting the time of creation and/or storage at the server, of each building report.

Figure 17:
FIG. 17 is an exemplary representation of an interface included in the sequence of interfaces shown in FIG. 6.

The reports are uploaded from the user devices 32 to the facility 10 (FIG. 1C) where aggregation module 112 aggregates and stores them in database 23 (FIG. 2). An optional Comment/Customize module 114 permits a user to add custom text or images to the report, such as at 210 of FIG. 13, and/or to comment on others' reports, such as by selecting the 'agree' icon to support others' reports as shown at 212 of FIG. 14. Rule Storage module 116 enables rules to be uploaded for storage in tables 45, 46, 50 and/or 52 (FIG. 2), and/or accessed during responses as discussed hereinbelow. View/Sort module 118 actuates the interfaces 212 and 214 of FIGS. 14 and 15 to display aggregated reports from one or more users. Response/Notification module 120 actuates interfaces 216, 218 and 220 of FIGS. 16A-16C, which permit the user, which in this instance is a responsible party such as a manager having relatively high level permissions, to access the system to select specific reports to see detail and manage reports. Examples include adding a detailed comment (FIG. 16A), entering or changing status of a report, e.g., 'resolved' (FIG. 16B), which may include automatically notifying the user who originally submitted the report, and/or assigning the report to another user (colleague) for appropriate action (FIG. 16C), which may also include automatically notifying the assignee. It is noted that the notifications provided by module 120 may be accomplished automatically in any convenient manner, such as via email, text, etc., or via in-app notification, using email/communication server 21 (FIG. 1C). An example of an in-app notification is shown in FIG. 17, in which an 'assigned to me' interface 222 may display all reports that have been assigned to a particular user for resolution.

In addition to automatic notifications, response module 120 may also provide other automatic responses. For example, module 120 may automatically adjust building controls (e.g., HVAC controls) in accordance with the predetermined rules, e.g., comfort rule table 50, for the particular property, which may be accessed by rule storage module 116. One example of a rule table 50 is shown in FIG. 4D. In this example, system 10 has received and aggregated temperature reports from 30 out of 38 users located in a particular HVAC zone. As also shown, of the users are requesting a temperature increase, while 5 are requesting a decrease, and 5 are requesting no temperature change. The rule table includes a weighting rule, which in this example, is pro rata, with 50 percent of the neutral 'no change' weightings being subtracted from each of the 'increase' and 'decrease' weights. An increase/decrease weighting rule subtracts the 'decrease' weighting from the 'increase' weighting, to yield a net weighting which if positive, corresponds to a percentage increase, and if negative corresponds to a percentage decrease of the 'Max Change' in temperature parameter. In the example shown, the aggregated reports produce a net weighting of +0.50 which dictates a positive adjustment of 50 percent of the 'Max Change' parameter of 5 degrees, to yield a recommended increase of 2.5 degrees. This recommended change may be effected automatically, by a transmission to the building HVAC system, or alternatively, may be sent to the interface 218 of FIG. 16B for action by a manager or other responsible party.

Figure 18:
FIG. 18 is an exemplary representation of an interface included in the sequence of interfaces shown in FIG. 6.

Response module 120 may also include an inspection module 122 configured to generate and populate a checklist display 224 such as shown in FIG. 18. The checklist interface enables a user to identify, e.g., with a checkmark, the particular asset being inspected. Aggregation module 124 serves to store and aggregate the various reports, including any comments/customization and responses, while also providing various reporting capabilities such as shown at 82 of FIG. 1B, and as will be discussed in greater detail hereinbelow.

Exemplary methods associated with system 100 of the present invention, will now be described as illustrated by the flow chart of FIGS. 7A and 7B.

Figure 7A:
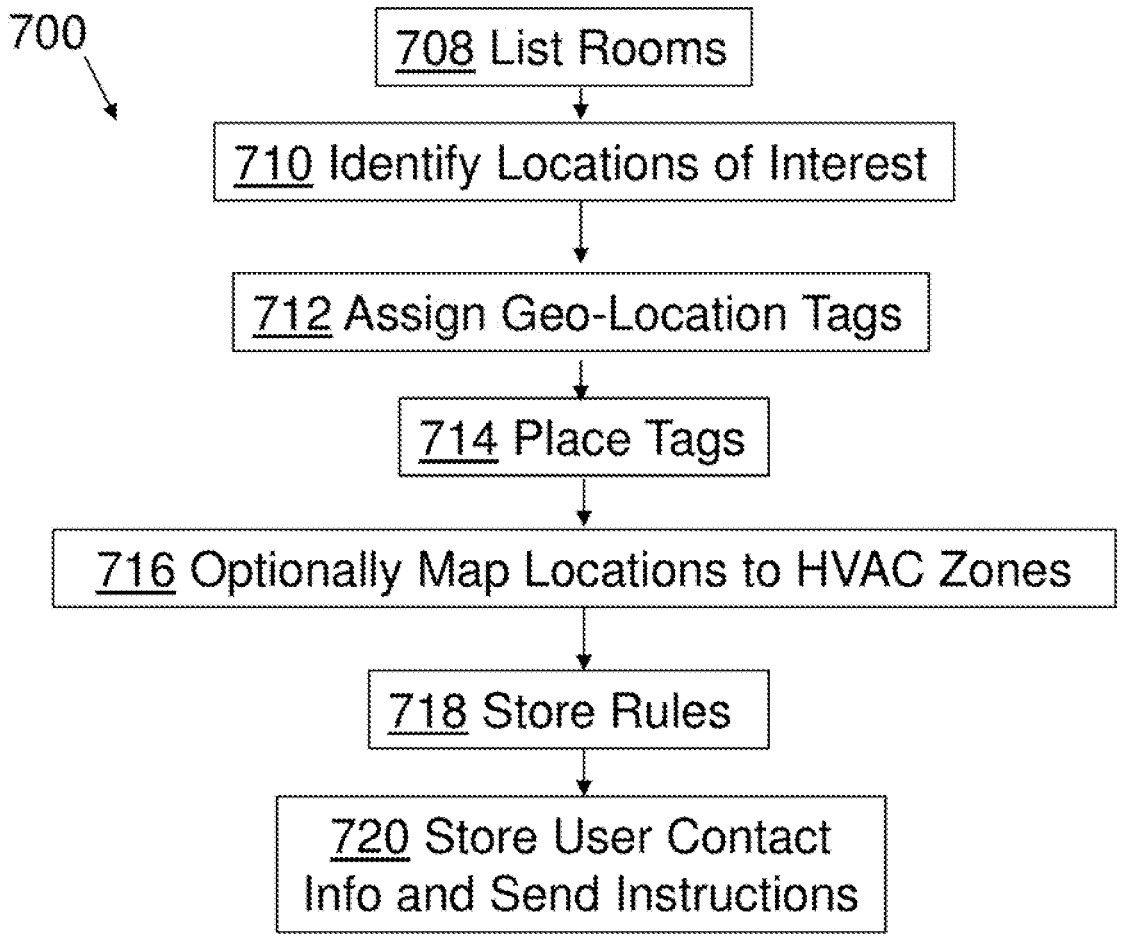
FIG. 7A is a flow chart of one embodiment for a method of the present invention.

Referring now to FIG. 7A, a method 700 for configuring the system for environmental comfort use at a particular property is shown and described. At 708, a list of rooms, including common areas, for the property is obtained, e.g., using floor plans such as shown in FIG. 4B, or created by touring the property and counting rooms, etc. At 710, a list of locations of interest within the rooms is generated. At 712, unique tags, such as individualized QR Codes, are generated for each location of interest. At 714, the tags are placed at the locations of interest, e.g., by printing the QR Codes onto markers which are physically placed at their corresponding locations. It should be noted that the locations of interest may be determined as granularly as desired. For example, a single room may have multiple tags, such as to capture comfort data at opposite ends of a large conference table. At 716, each location of interest is optionally mapped to an HVAC zone in the building. At 718, a set of rules (e.g., comfort, maintenance, inspection, etc.) rules is set for the particular property, e.g., to determine how often and how much the temperature can be changed by the system within an HVAC zone, etc. At 720, user contact information is captured and stored to table(s) 40, and notification, e.g., by email, text, social media, etc., is sent to employees or occupants of the property letting them know about the system and providing instruction on how to use it.

Figure 7B:
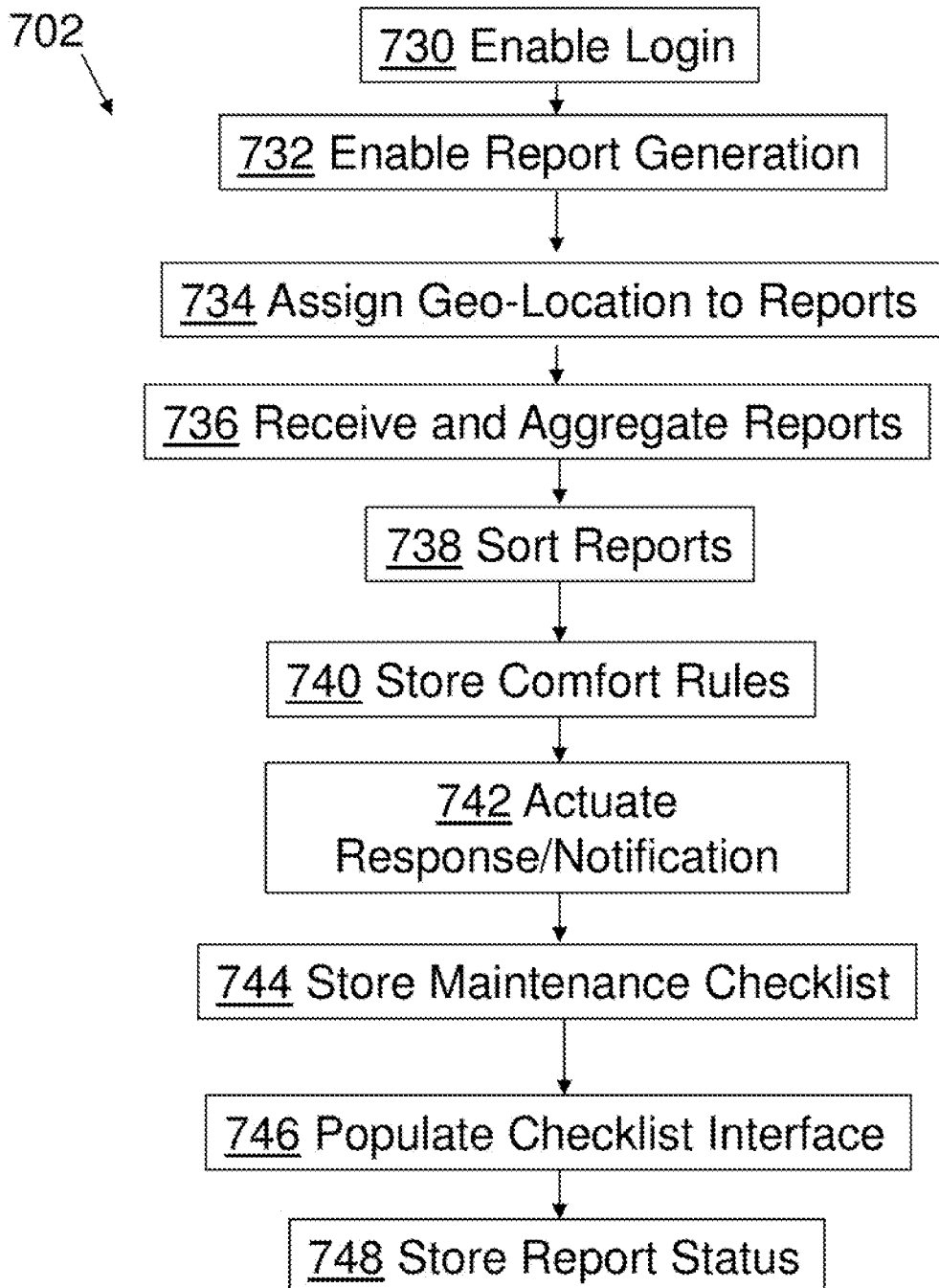
FIG. 7B is a flow chart of another embodiment for a method of the present invention.

Referring now to FIG. 7B, a method 702 for operating system 100 is shown and described. As shown, the method 702 commences with enabling the login module at 730 to provide user interface information to a user of the transaction facility at client 32 (FIG. 1). More specifically, the user interface information may provide a login interface via login module 102 (FIG. 6). Subsequent to the login by the user, at 732 the report access module is actuated to generate a report interface displayable on the client computers to enable the users to generate one or more building reports in the form of (i) thermal reports using a thermal report module, and/or (ii) maintenance reports using a maintenance report module. At 734, the geo-location module 106 is actuated to assign a location within the building to each building report. At 736, the aggregation module 112 is actuated to receive the building reports from the client computers, and to store and aggregate the building reports at the server. At 738, the View/Sort module 118 sorts the aggregated reports according to their assigned locations, and transmits the sorted reports to the one or more client computers for display. At 740, rule storage module 116 is actuated to store any comfort rules for the building that have not previously been loaded into database 23 (FIG. 1C). At 742, Response/Notification module 120 is actuated to (i) permit a manager at a client computer to access the server to select for response, and assign a response status, to particular reports, and/or (ii) automatically respond and assign a response status to particular reports in accordance with said set of comfort rules. At 744, checklist storage module 122 is actuated to store a list of preventative maintenance items for the building. At 746, inspection module 124 is actuated to generate and populate a checklist interface on the user device, the checklist interface configured to display the list of preventative maintenance tasks, each of the tasks being user-selectable to designate completion of each individual task. At 748, the aggregation module 112 is actuated to store the status of the reports.

Figure 7C:
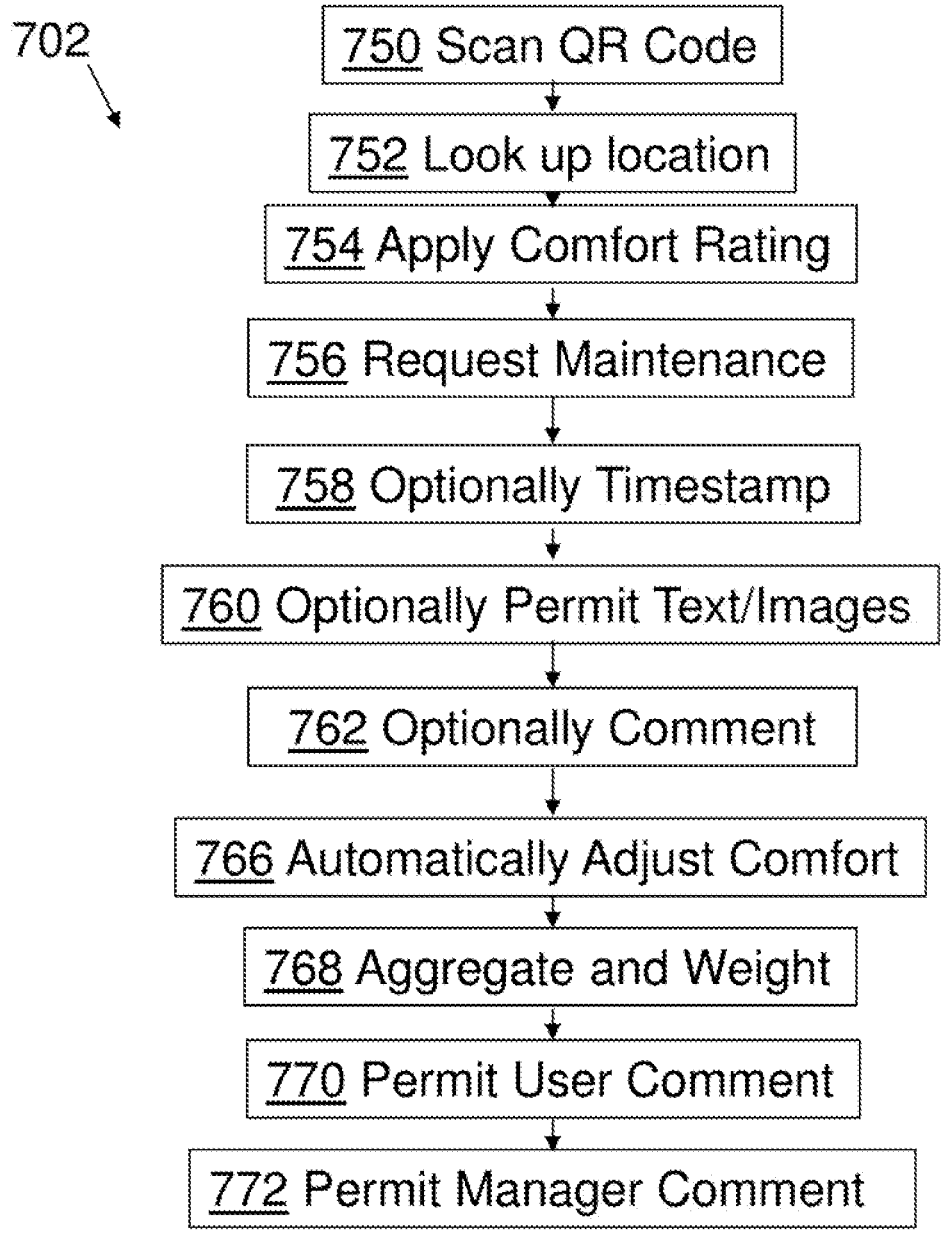
FIG. 7C is a flow chart of another embodiment for a method of the present invention.

Various optional additions to method 702 are shown in flowchart 704 of FIG. 7C. As shown, at 750, report access module 104 is actuated to permit a client computer to generate a building report by scanning a QR code disposed at a predetermined location within the building. At 752, report access module 104 is actuated to permit a client computer to generate a building report by looking up a particular location within the building. At 754, report access module 104 is actuated to permit a client computer to apply a thermal comfort rating to one or more of the thermal reports. At 756, report access module 104 is actuated to permit a client computer to apply a maintenance request to one or more maintenance reports. At 758, optional time-stamp module 126 is actuated to store a time stamp denoting the time of creation and/or storage at the server, of each building report. At 760, optional Comment/Customize module 114 is actuated to permit a user at a client computer to add custom text and/or images to a report. At 762, step 760 further includes permitting the user to comment on reports. At 766, Response/Notification module 120 is actuated to automatically adjust the environmental control system in accordance with the predetermined rules for the building. At 768, Response/Notification module 120 is configured to aggregate and assign weights to reports associated with a particular location, and to use the weights to generate a control signal to adjust one or more operational parameters of the environmental control system. At 770, Response/Notification module 120 is actuated to permit a user, via the one or more client computers, to add a comment to one or more reports. At 772, step 770 further includes permitting a manager, via the one or more client computers, to assign one or more reports to one or more particular users for response.

It should be recognized that in the embodiments shown and described hereinabove, heat maps, such as shown at 82 in FIG. 1B, may be automatically generated and displayed in the user device interface(s) once thermal reports are aggregated. Moreover, as reports come in notifications may be provided directly to the individuals who need them. For example a comfort report may be delivered directly to the smart phone device of the person who manages the building management system, but a report on the generator may go to the device of an appropriate Environmental Health and Safety professional.

Particular embodiments may also be configured to accept an initiation of a temperature change by any individual who works in a particular zone. This process may be generally the same for every kind of occupied office space except the individual office on a single room zone. In that case, the occupant could increase the set-point on his or her own (within normal set-point ranges).

In addition to the rules in the temperature adjustment example shown and described hereinabove, the temperature change mechanism may have any number of additional rules, such as those that limit the number of changes that can be initiated by per day or per hour. Moreover, the rules may be space (zone) specific. The rules are typically set by the employer, or building manager and may be adjusted easily as needed.

Once a temperature change is initiated all of the employees in the zone may be notified by any convenient method. An exemplary notification may state:

"An individual in your zone is uncomfortable and has requested a temperature change. Your feedback is important so please let us know your preference to increase, decrease or maintain the current temperature. To do so please open the CrowdComfort application and provide your choice. In order for us to account for your temperature preference we will need your participation within 5 minutes of receipt of this notice."

After the 5 minute period the votes may be tabulated by embodiments of the present invention.

It should also be recognized that data may be gathered an accumulated and a profile generated for each user submitting a comfort report. For individuals that are often uncomfortable, managers may begin to address their levels at an individual level as opposed to at the system/zone level. Moreover, users who are habitual outliers may be accorded less weight than other users. Still further, although QR Codes have been shown and described as a convenient geo-location device, other approaches for geo-location may include Wi-Fi, Bluetooth, I-Beacon, RFID or other location method to send the notification only to people within a particular zone.

It should also be recognized that although the various embodiments have been shown and described with respect to particular buildings, the embodiments need not be limited solely to interior applications. Rather, the embodiments may be applied to various property types, including buildings and campuses having both interior and exterior locations of interest, including rooftop decks and equipment, courtyards, patios, etc., for which it may be desirable to receive and aggregate comfort, maintenance, and/or inspection reports.

Figure 19:
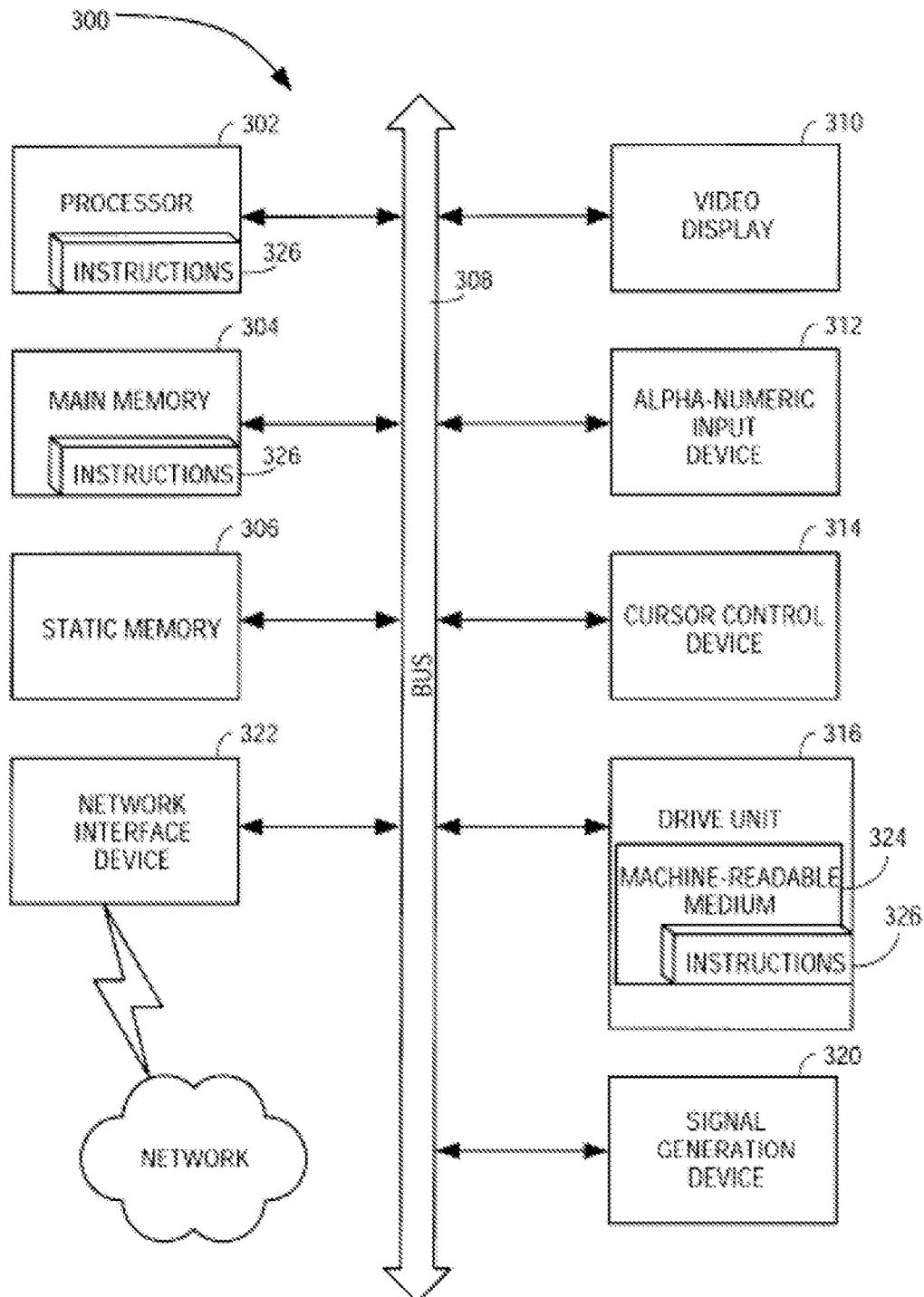
FIG. 19 is a block diagram of one embodiment of a computer system usable in various aspects of the present invention.

FIG. 19 shows a diagrammatic representation of a machine in the exemplary form of a computer system 300 within which a set of instructions, for causing the machine to perform any one of the methodologies discussed above, may be executed. In alternative embodiments, the machine may include a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD), plasma, cathode ray tube (CRT), etc.). The computer system 300 may also include an alpha-numeric input device 312 (e.g., a keyboard or touchscreen), a cursor control device 314 (e.g., a mouse), a drive (e.g., disk, flash memory, etc.,) unit 316, a signal generation device 320 (e.g., a speaker) and a network interface device 322.

The drive unit 316 includes a computer-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "computer-readable medium" shall be taken to include any medium that is capable of storing or encoding a sequence of instructions for execution by the computer and that cause the computer to perform any one of the methodologies of the present invention, and as further described hereinbelow.

Furthermore, embodiments of the present invention include a computer program code-based product, which includes a computer readable storage medium having program code stored therein which can be used to instruct a computer to perform any of the functions, methods and/or modules associated with the present invention. The non-transitory computer readable medium includes any of, but not limited to, the following: CD-ROM, DVD, magnetic tape, optical disc, hard drive, floppy disk, ferroelectric memory, flash memory, phase-change memory, ferromagnetic memory, optical storage, charge coupled devices, magnetic or optical cards, smart cards, EEPROM, EPROM, RAM, ROM, DRAM, SRAM, SDRAM, and/or any other appropriate static, dynamic, or volatile memory or data storage devices, but does not include a transitory signal per se.

The above systems are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic or non-volatile, and may be retrieved by the user in any of: conventional computer storage, display (e.g., CRT, flat panel LCD, plasma, etc.) and/or hardcopy (i.e., printed) formats. The programming of the present invention may be implemented by one skilled in the art of computer systems and/or software design.

Figure 20:
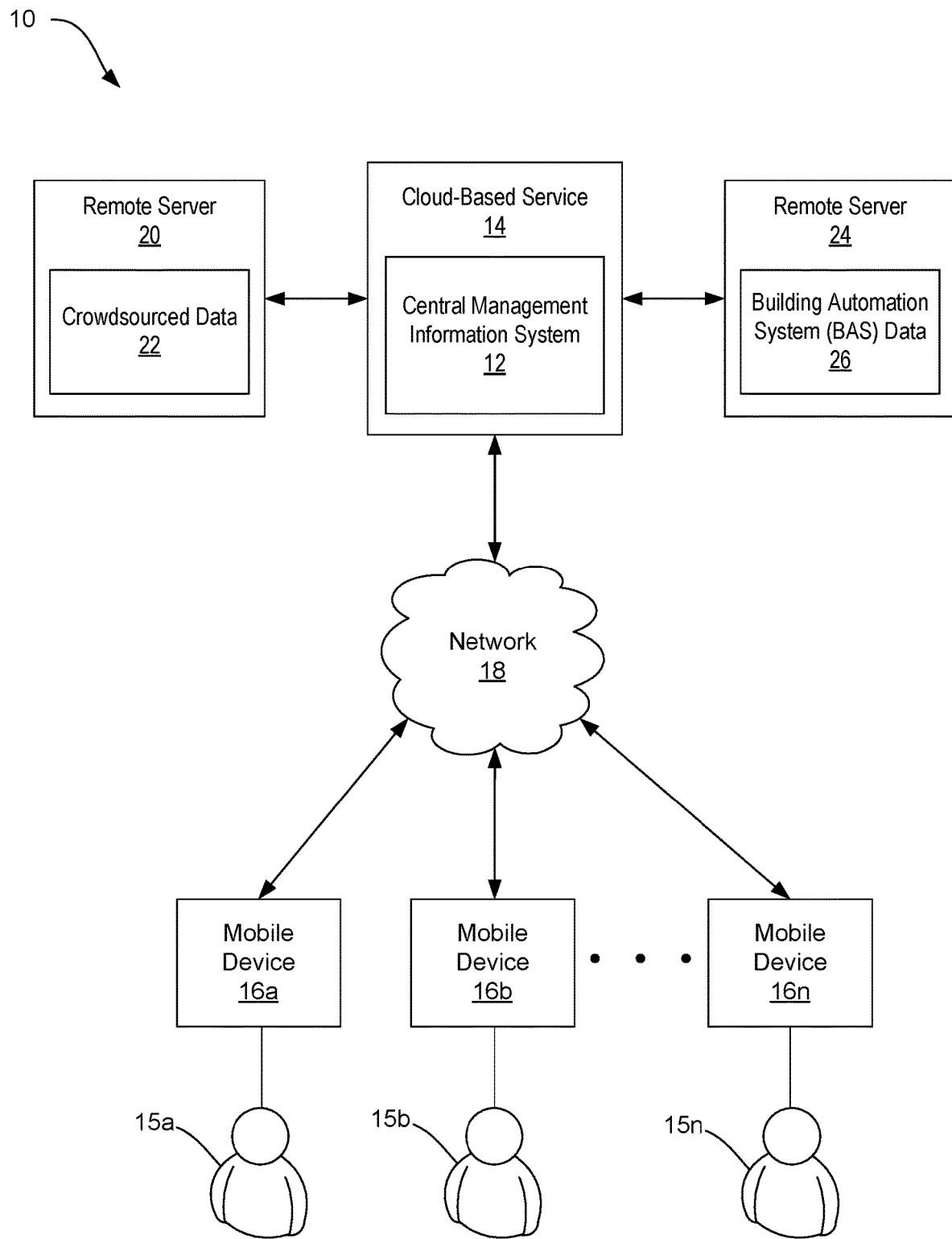
FIG. 20 is a block diagram illustrating one embodiment of an exemplary system for providing an augmented reality-like interface for the management and maintenance of building systems, specifically the mechanical, electrical, and plumbing (MEP) systems within a building, including the heating, ventilation, and air-conditioning (HVAC) systems.

FIG. 20 is a block diagram illustrating one embodiment of an exemplary system 10 for providing an augmented reality-like interface for the management and maintenance of building systems, specifically the mechanical, electrical, and plumbing (MEP) systems within a building, including the heating, ventilation, and air-conditioning (HVAC) systems.

As shown, the system 10 includes a central management information system 12 embodied on an internet-based computing system/service. For example, as shown, the system 12 may be embodied on a cloud-based service 14, for example. The system 12 is configured to communicate and share data with one or more users 15(1)-15(n) via user mobile devices 16(a)-16(n) over a network 18. In the present context, the users 15(1)-15(n) may include administrators, customers, or clients of a service provided to one or more remote users via the system 12. The users 15(1)-15(n) may also include particular persons to which the service is directed.

For example, the system 12 may generally be configured to correlate crowd-sourced data with building automation system data and output an augmented reality-like interface to one or more users 15 responsible for, or otherwise associated with, control or maintenance over the building systems, such as a facilities manager or a building maintenance engineer. The augmented reality-like interface generally provides a visual rendering of a piece of equipment or component of a building system and further includes information associated with at least one of the operating parameters, visual diagnostics, and maintenance status of the component. The interface allows for a user to interact with the visual rendering to control different parameters of the component and/or address any maintenance issues, as based on the crowdsourced data.

The system 10 may further include at least a first remote server 20 including the crowdsourced data 22 and a second remote server 24 including building automation system data 26. The central management information system 12 may be configured to communicate with both the first and second remote servers 20 and 24 and receive the associated date therefrom for the purpose of providing the augmented reality-like interface to a user 15 and their associated mobile device 16 over the network 18, as will be described in greater detail herein.

For example, the crowd-sourced data may generally be collected from patrons or employees within a space and may be related to comfort issues such as HVAC (e.g., temperature of a particular room within a building), building maintenance issues (e.g., lighting issues, cleanliness of facilities, etc.), as well as other aspects of a building or space that may be useful in management of such space. The building automation system data may generally include information related to individual pieces of equipment or components for any given environmental system within a space (i.e., within the building). The equipment information may include, but is not limited to, equipment specifications, operating parameters of the equipment, equipment diagnostics, as well as maintenance status of the equipment. The building automation system data may further include one or more files including one or more visual renderings of the equipment, including still images and moving images (two-dimensional and three-dimensional) for providing visual illustration of the equipment and the internal components of the equipment, as well as illustrations depicting real-time diagnostics of the component while in operation.

The network 18 may represent, for example, a private or non-private local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). In alternative embodiments, the communication path between the mobile devices 16, between the mobile devices 16 and the cloud-based service 14 and/or the external computing device/system/server 22, may be, in whole or in part, a wired connection. Accordingly, the mobile device 16 may be embodied as any type of device for communicating with the system 12 and cloud-based service 14, and/or other user devices over the network 18. For example, at least one of the user devices may be embodied as, without limitation, a computer, a desktop computer, a personal computer (PC), a tablet computer, a laptop computer, a notebook computer, a mobile computing device, a smart phone, a cellular telephone, a handset, a messaging device, a work station, a distributed computing system, a multiprocessor system, a processor-based system, and/or any other computing device configured to store and access data, and/or to execute software and related applications consistent with the present disclosure. In the embodiments described here, the mobile device 16 is generally embodied as a smartphone or tablet computer having an interactive display for allowing a user 15 to interact with the augmented reality-like interface.

Figure 21:
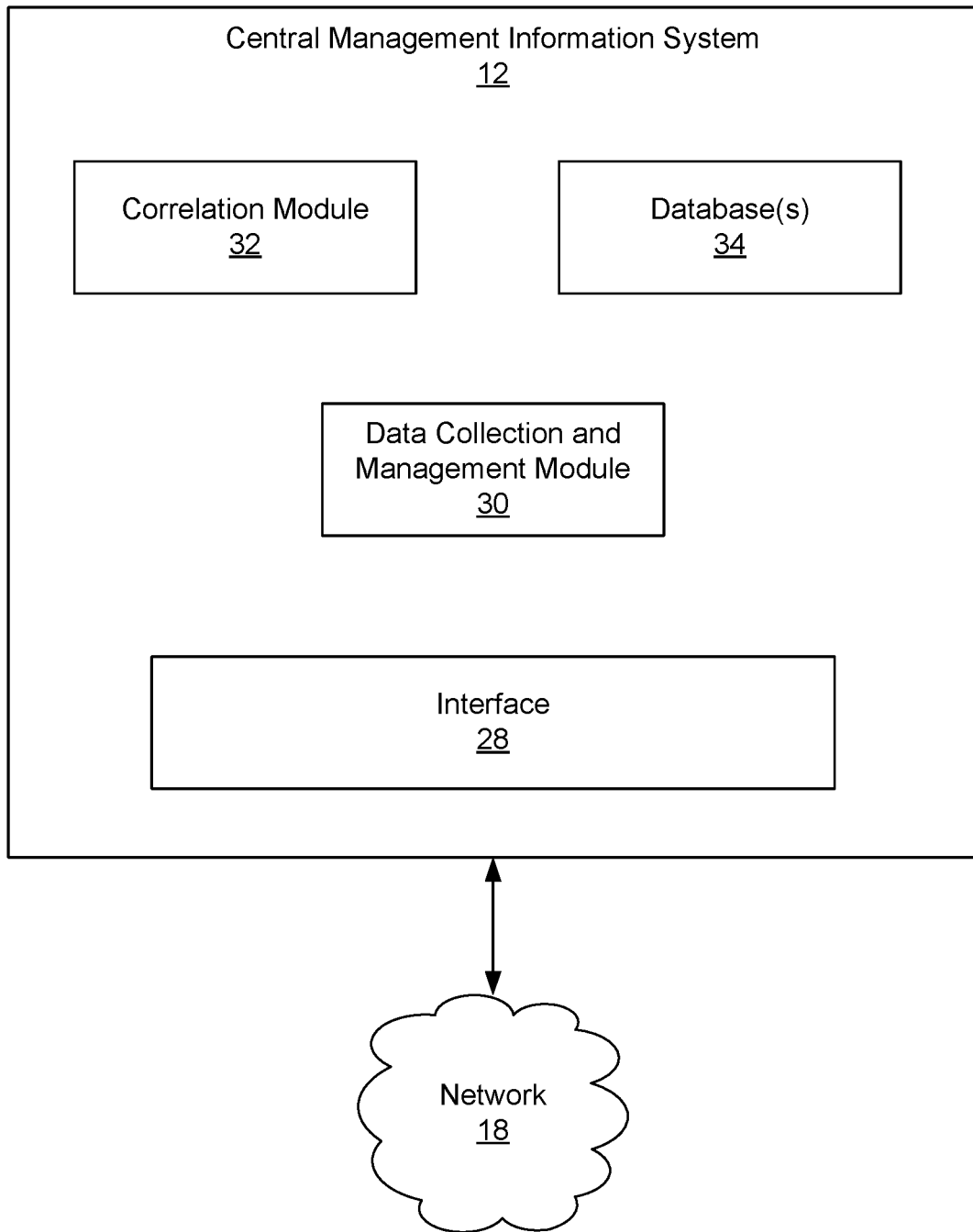
FIG. 21 is a block diagram illustrating the central management information system of FIG. 20 in greater detail.

FIG. 21 is a block diagram illustrating the central management information system 12 in greater detail. As shown, the system 12 may include an interface 28, a data collection and management module 30, a correlation module 32, and one or more databases 34 for data related data received from the mobile devices 16. For example, the data collection and management module 30 may be configured to communicate and exchange data with at least the correlation module 32 and one or more databases 34, each of which is described in greater detail herein.

The interface 28 may generally allow a user (e.g., facilities manager or maintenance worker) to access the service provided by the system 12. For example, upon accessing the system 12 on the cloud-based service 14, the interface 28 may be presented to the user via their device 16, in which the user may navigate a dashboard or standard platform interface so as begin interaction with the service provided. In particular, the interface 28 may allow a user 15 to scan a QR code and, in turn, the system 12 is configured to provide the user with an augmented reality-like interface in which a visual rendering of a piece of equipment associated with the room or wall or space in which the QR code is located, as will be described in greater detail herein.

Figure 22:
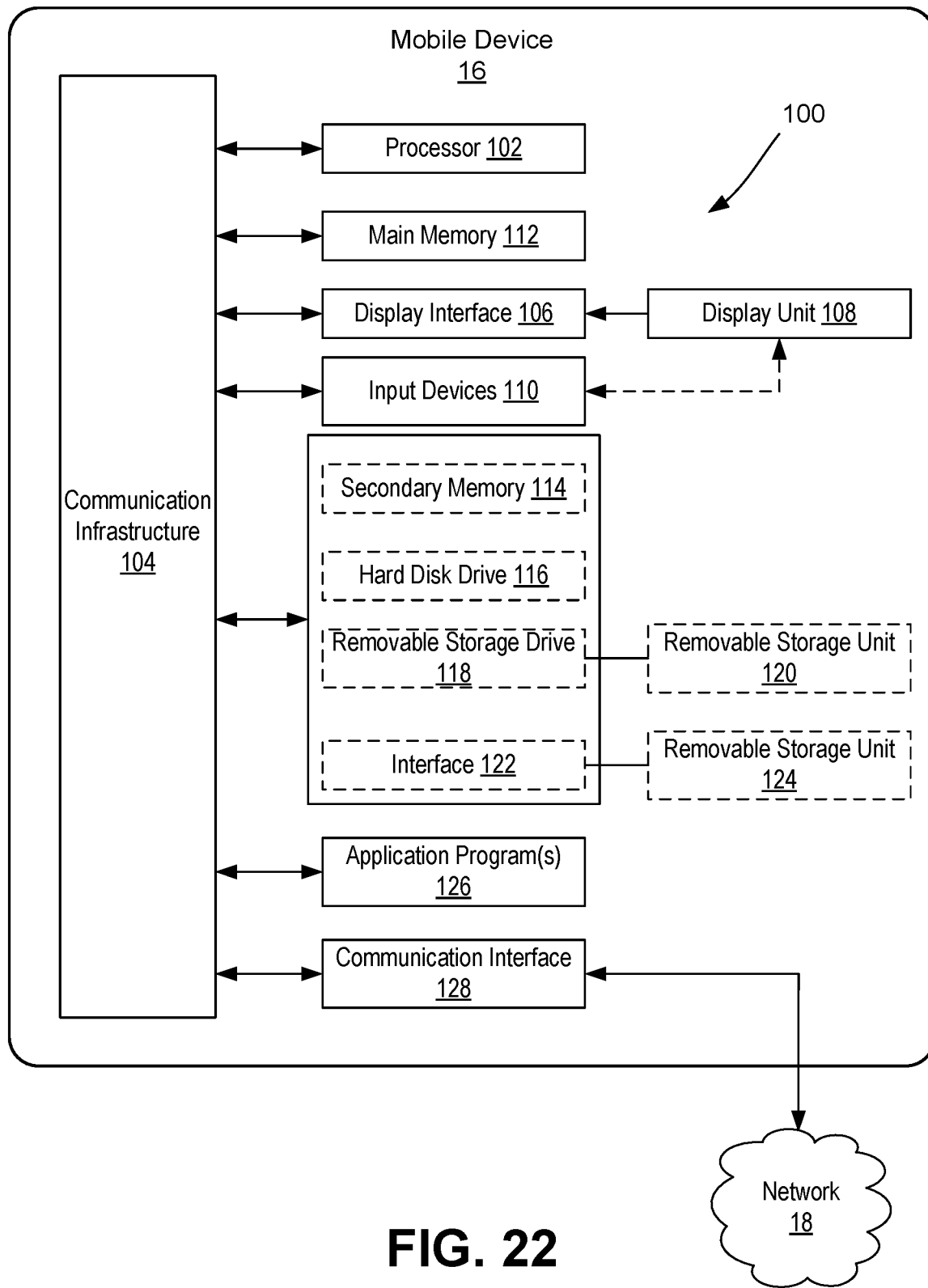
FIG. 22 is a block diagram illustrating at least one embodiment of a mobile device for providing the augmented reality-like interface to a user consistent with the present disclosure.

FIG. 22 is a block diagram illustrating at least one embodiment of a mobile device 16 for allowing a user to utilize the service provided by the system 10 and to further display the augmented reality-like interface provided by the system 12. The mobile device 16 generally includes a computing system 100. As shown, the computing system 100 includes one or more processors, such as processor 102. Processor 102 is operably connected to communication infrastructure 104 (e.g., a communications bus, cross-over bar, or network). The processor 102 may be embodied as any type of processor capable of performing the functions described herein. For example, the processor may be embodied as a single or multi-core processor(s), digital signal processor, microcontroller, or other processor or processing/controlling circuit.

The computing system 100 further includes a display interface 106 that forwards graphics, text, sounds, and other data from communication infrastructure 104 (or from a frame buffer not shown) for display on display unit 108. The computing system further includes input devices 110. The input devices 110 may include one or more devices for interacting with the mobile device 16, such as a keypad, microphone, camera, as well as other input components, including motion sensors, and the like. In one embodiment, the display unit 108 may include a touch-sensitive display (also known as "touch screens" or "touchscreens"), in addition to, or as an alternative to, physical push-button keyboard or the like. The touch screen may generally display graphics and text, as well as provides a user interface (e.g., but not limited to graphical user interface (GUI)) through which a user may interact with the mobile device 16, such as accessing and interacting with applications executed on the device 16, including an app for providing direct user input with the augmented reality-like interface.

The computing system 100 further includes main memory 112, such as random access memory (RAM), and may also include secondary memory 114. The main memory 112 and secondary memory 114 may be embodied as any type of device or devices configured for short-term or long-term storage of data such as, for example, memory devices and circuits, memory cards, hard disk drives, solid-state drives, or other data storage devices. Similarly, the memory 112, 114 may be embodied as any type of volatile or non-volatile memory or data storage capable of performing the functions described herein.

In the illustrative embodiment, the mobile device 16 may maintain one or more application programs, databases, media and/or other information in the main and/or secondary memory 112, 114. The secondary memory 114 may include, for example, a hard disk drive 116 and/or removable storage drive 118, representing a floppy disk drive, a magnetic tape drive, an optical disk drive, etc. Removable storage drive 118 reads from and/or writes to removable storage unit 120 in any known manner. The removable storage unit 120 may represents a floppy disk, magnetic tape, optical disk, etc. which is read by and written to by removable storage drive 118. As will be appreciated, removable storage unit 120 includes a computer usable storage medium having stored therein computer software and/or data.

In alternative embodiments, the secondary memory 114 may include other similar devices for allowing computer programs or other instructions to be loaded into the computing system 100. Such devices may include, for example, a removable storage unit 124 and interface 122. Examples of such may include a program cartridge and cartridge interface (such as that found in video game devices), a removable memory chip (such as an erasable programmable read only memory (EPROM), or programmable read only memory (PROM)) and associated socket, and other removable storage units 124 and interfaces 122, which allow software and data to be transferred from removable storage unit 124 to the computing system 100.

The computing system 100 further includes one or more application programs 126 directly stored thereon. The application program(s) 126 may include any number of different software application programs, each configured to execute a specific task.

The computing system 100 further includes a communications interface 128. The communications interface 128 may be embodied as any communication circuit, device, or collection thereof, capable of enabling communications between the mobile device 16 external devices (other mobile devices 16, the cloud-based service 14, and the external computing system/server 22). The communications interface 128 may be configured to use any one or more communication technology and associated protocols, as described above, to effect such communication. For example, the communications interface 128 may be configured to communicate and exchange data with the server 12, the external computing system/server 22 and/or one other mobile device 16 via a wireless transmission protocol including, but not limited to, Bluetooth communication, infrared communication, near field communication (NFC), radio-frequency identification (RFID) communication, cellular network communication, the most recently published versions of IEEE 802.11 transmission protocol standards as of June 2015, and a combination thereof. Examples of communications interface 228 may include a modem, a network interface (such as an Ethernet card), a communications port, a Personal Computer Memory Card International Association (PCMCIA) slot and card, wireless communication circuitry, etc.

Computer programs (also referred to as computer control logic) may be stored in main memory 112 and/or secondary memory 114 or a local database on the mobile device 16. Computer programs may also be received via communications interface 128. Such computer programs, when executed, enable the computing system 100 to perform the features of the present invention, as discussed herein. In particular, the computer programs, including application programs 126, when executed, enable processor 102 to perform the features of the present invention. Accordingly, such computer programs represent controllers of computer system 100.

In one embodiment where the invention is implemented using software, the software may be stored in a computer program product and loaded into the computing system 100 using removable storage drive 118, hard drive 116 or communications interface 128. The control logic (software), when executed by processor 102, causes processor 102 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

The present invention includes a system for providing an augmented reality-like interface for the management and maintenance of building systems, specifically mechanical, electrical, and plumbing (MEP) systems within a building, which may include heating, ventilation, and air-conditioning (HVAC) systems. In particular, the system includes a central management information system is configured to correlate crowd-sourced data with building automation system data and output an augmented reality-like interface to one or more users responsible for, or otherwise associated with, control or maintenance over the building systems, such as a facilities manager or a building maintenance engineer. The augmented reality-like interface generally provides a visual rendering of a piece of equipment or component of a building system and further includes information associated with at least one of the operating parameters, visual diagnostics, and maintenance status of the equipment. The interface allows for a user to interact with the visual rendering to control different parameters of the component and/or address any maintenance issues, as based on the crowdsourced data.

For example, the crowd-sourced data may generally be collected from patrons or employees within a space and may be related to comfort issues such as HVAC (e.g., temperature of a particular room within a building), building maintenance issues (e.g., lighting issues, cleanliness of facilities, etc.), as well as other aspects of a building or space that may be useful in management of such space. The building automation system data may generally include information related to individual pieces of equipment or components for any given environmental system within a space (i.e., within the building). The equipment information may include, but is not limited to, equipment specifications, operating parameters of the equipment, equipment diagnostics, as well as maintenance status of the equipment. The building automation system data may further include one or more files including one or more visual renderings of the equipment, including still images and moving images (two-dimensional and three-dimensional) for providing visual illustration of the equipment and the internal components of the equipment, as well as illustrations depicting real-time diagnostics of the component while in operation.

The central management information system 12 is configured to receive both crowdsourced data (data related to patron comfort levels or maintenance issues, as well as QR codes associated with such data) and building automation system data (e.g., data related to the environmental control systems (e.g., HVAC system and individual equipment)) to provide a facility manager/operator with an augmented reality-like graphical interface with which they may interact to address any required maintenance or equipment issues. For example, in some embodiments, the system is configured to recognize when a user cans a QR code at a given location. The QR codes, or similar tags, may be placed at specific locations within a building, and, upon scanning the QR code, the system is configured to receive crowdsourced data associated with the particular QR code and further receive building automation system data based on the scanning event. In particular, the QR code may act as an identifier, signaling the system to receive data associated with a given piece of equipment or system at the particular location in which the QR code is location. For example, a user (e.g., building maintenance worker) may scan a QR code within a given office within a building, wherein the system is then configured to receive the scanning event, receive crowdsourced data associated with the scanning event, and further pull up schematics and/or a list of equipment within the walls of the office. The system provides such equipment information to the user on the user's mobile device via an augmented reality-like graphical interface. The equipment information may further provide a user with potential problems if connected to a central facility management system. The equipment information may further provide the user with any maintenance and inspections that need to performed.

Figure 23:
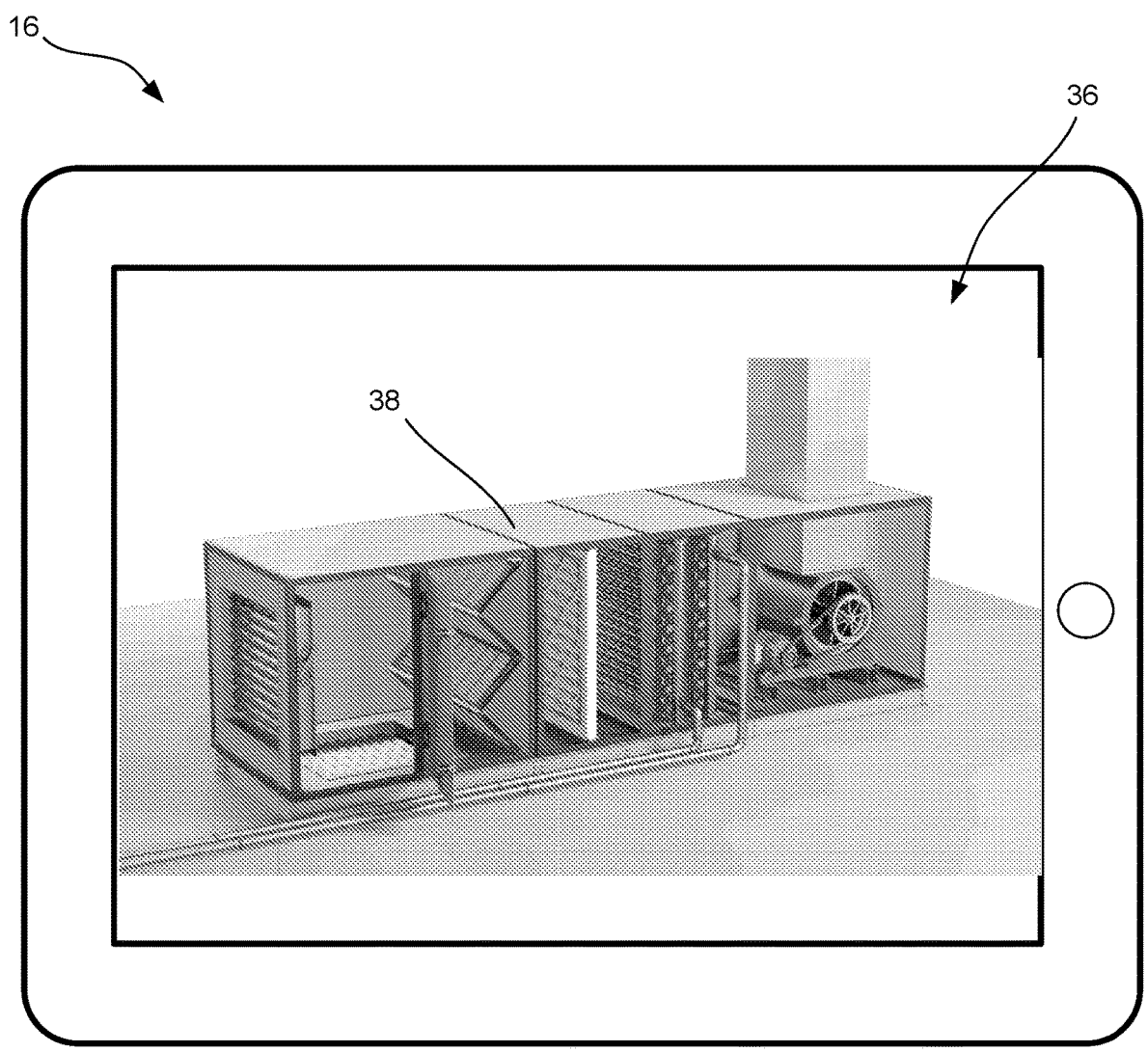
FIG. 23 illustrates an exemplary augmented reality-like interface output to a mobile device and providing a visual rendering of operating equipment of a HVAC system.

FIG. 23 illustrates an exemplary augmented reality-like interface 36 output to a mobile device 16 and providing a visual rendering of operating equipment 38 of a HVAC system. The visual rendering may include still images or may further include animations providing detail information about the operating status of the equipment 38 or the like.

As such, a user, such as a facility manager, a building maintenance engineer, or the like, may directly interact with the building automation system and the equipment in a direct manner via their mobile device, while utilizing the crowdsourcing platform in which patrons or employees within the building can provide their comfort levels and/or maintenance issues. Accordingly, the system of the present invention provides robust and optimal communication systems for improving building maintenance, further improving a user's ability to diagnose issues and understand the current status of the systems.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof

What is claimed is:

1. A method for providing an augmented reality interface for crowdsourced management and maintenance of a plurality of building spaces, the method comprising:
providing a crowdsourcing platform having an interface with which users can interact, via user mobile devices, for crowdsourced building management and maintenance;
receiving, via the crowdsourcing platform, user reports, wherein each user report is related to a maintenance, comfort, or inspection issue and is associated with a time and location of the user mobile device from which the report was made;
aggregating, via the crowdsourcing platform, the user reports based on issue, time, and building space;
receiving, via the crowdsourcing platform, information relating to a location of an authorized user mobile device;
identifying, via the crowdsourcing platform, a building space associated with the authorized user mobile device location;
identifying, via the crowdsourcing platform, user reports related to a given issue for the identified building space;
identifying, via the crowdsourcing platform, a piece of equipment associated with the given issue for the identified building space; and
generating and outputting an augmented reality interface to the authorized user mobile device, wherein the augmented reality interface comprises at least one interactive visual rendering, each interactive visual rendering including the piece of equipment and a selected one of the identified user reports through which the authorized user can interact with and respond to the identified user reports to address the given issue.

2. The method of claim 1, wherein at least some of the user reports include at least one of custom text, images, or comments on others' reports.

3. The method of claim 1, wherein aggregating the user reports further comprises weighting the user reports based on a predetermined weighting rule.

4. The method of claim 1, wherein the location of at least one of the user mobile devices or the authorized user mobile device is based on a scan of a unique identifier situated at the location.

5. The method of claim 1, wherein the piece of equipment is associated with at least one of mechanical, electrical, and plumbing systems of a building.

6. The method of claim 5, wherein the piece of equipment is associated with at least one of heating, ventilation, and air-conditioning (HVAC) systems of a building.

7. The method of claim 1, wherein the augmented reality interface comprises a visual illustration of the equipment, the visual illustration depicting at least one of internal components of the equipment and real-time diagnostics of the equipment while in operation.

8. The method of claim 1, further comprising:
receiving input from the authorized user mobile device with respect to an interactive visual rendering;
generating a control signal for the piece of equipment; and
transmitting the control signal to said piece of equipment to cause adjustment of operation of said piece of equipment.

9. The method of claim 8, further comprising:
identifying user mobile devices located in the identified building space; and
transmitting a notification to each user mobile device located in the identified building space regarding the adjustment.

10. The method of claim 9, wherein the notification allows the users associated with the user mobile devices to vote on the adjustment.

11. A system for providing an augmented reality interface for crowdsourced management and maintenance of a plurality of building spaces, the system comprising:
a central management information system configured to communicate and exchange data with one or more user mobile devices over a network, each user mobile device associated with a respective user, the central management information system comprising at least one hardware processor coupled to at least one non-transitory, computer-readable memory containing instructions executable by the at least one processor to cause the central management information system to perform processes comprising:

providing a crowdsourcing platform having an interface with which users can interact, via user mobile devices, for crowdsourced building management and maintenance;

receiving, via the crowdsourcing platform, user reports, wherein each user report is related to a maintenance, comfort, or inspection issue and is associated with a time and location of the user mobile device from which the report was made;

aggregating, via the crowdsourcing platform, the user reports based on issue, time, and building space;

receiving, via the crowdsourcing platform, information relating to a location of an authorized user mobile device;

identifying, via the crowdsourcing platform, a building space associated with the authorized user mobile device location;

identifying, via the crowdsourcing platform, user reports related to a given issue for the identified building space;

identifying, via the crowdsourcing platform, a piece of equipment associated with the given issue for the identified building space; and generating and outputting an augmented reality interface to the authorized user mobile device, wherein the augmented reality interface comprises at least one interactive visual rendering, each interactive visual rendering including the piece of equipment and a selected one of the identified user reports through which the authorized user can interact with and respond to the identified user reports to address the given issue.

12. The system of claim 11, wherein at least some of the user reports include at least one of custom text, images, or comments on others' reports.

13. The system of claim 11, wherein aggregating the user reports further comprises weighting the user reports based on a predetermined weighting rule.

14. The system of claim 11, wherein the location of at least one of the user mobile devices or the authorized user mobile device is based on a scan of a unique identifier situated at the location.

15. The system of claim 11, wherein the piece of equipment is associated with at least one of mechanical, electrical, and plumbing systems of a building.

16. The system of claim 15, wherein the piece of equipment is associated with at least one of heating, ventilation, and air-conditioning (HVAC) systems of a building.

17. The system of claim 11, wherein the augmented reality interface comprises a visual illustration of the equipment, the visual illustration depicting at least one of internal components of the equipment and real-time diagnostics of the equipment while in operation.

18. The system of claim 11, further comprising:
receiving input from the authorized user mobile device with respect to an interactive visual rendering;
generating a control signal for the piece of equipment; and
transmitting the control signal to said piece of equipment to cause adjustment of operation of said piece of equipment.

19. The system of claim 18, further comprising:
identifying user mobile devices located in the identified building space; and
transmitting a notification to each user mobile device located in the identified building space regarding the adjustment.

20. The system of claim 19, wherein the notification allows the users associated with the user mobile devices to vote on the adjustment.

\* \* \* \* \*